US010676331B1

(12) United States Patent
Dorsey

(10) Patent No.: US 10,676,331 B1
(45) Date of Patent: Jun. 9, 2020

(54) WINCH FOR AN AERIAL DRONE DEPLOYED NON-DESTRUCTIVE EVALUATION SCANNER

(71) Applicant: ScanTech Instruments, Inc., Longview, TX (US)

(72) Inventor: Harvey Alan Dorsey, Longview, TX (US)

(73) Assignee: ScanTech Instruments, Inc., Longview, TX (US)

( * ) Notice: Subject to any disclaimer, the term of this patent is extended or adjusted under 35 U.S.C. 154(b) by 0 days.

(21) Appl. No.: 16/378,429

(22) Filed: Apr. 8, 2019

Related U.S. Application Data

(63) Continuation of application No. 16/292,243, filed on Mar. 4, 2019, which is a continuation-in-part of application No. 16/127,218, filed on Sep. 10, 2018, now Pat. No. 10,252,800, which is a continuation-in-part of application No. 15/333,181, filed on Oct. 24, 2016, now Pat. No. 10,072,745.

(60) Provisional application No. 62/725,270, filed on Aug. 31, 2018, provisional application No. 62/245,983, filed on Oct. 23, 2015.

(51) Int. Cl.
*B60Q 1/00* (2006.01)
*B66D 3/20* (2006.01)
*B64C 39/02* (2006.01)

(52) U.S. Cl.
CPC .............. *B66D 3/20* (2013.01); *B64C 39/024* (2013.01); *B64C 2201/123* (2013.01); *B64C 2201/127* (2013.01); *B64C 2201/148* (2013.01)

(58) Field of Classification Search
CPC ... B66D 3/20; B64C 39/024; B64C 2201/123; B64C 2201/127; B64C 2201/148
See application file for complete search history.

(56) References Cited

U.S. PATENT DOCUMENTS

| 3,443,020 | A | * | 5/1969 | Loshigian | H01B 7/045 174/101.5 |
| 3,613,627 | A | * | 10/1971 | Kennedy | B63B 21/663 114/243 |
| 4,350,110 | A | * | 9/1982 | Knutson | H02G 1/10 114/243 |
| 4,655,155 | A | * | 4/1987 | Folb | B63B 21/663 114/243 |
| 8,738,198 | B2 | * | 5/2014 | Schempf | B25J 11/002 701/2 |

(Continued)

*Primary Examiner* — Quang Pham
(74) *Attorney, Agent, or Firm* — Mark W. Handley; Handley Law Firm, PLLC

(57) ABSTRACT

A test unit (412) has an aerial drone (414) which deploys an NDE scanner (416) on a metal surface of the EUT (26) from an aerial drone (414). The test unit (412) has a winch (424) with a winch drive motor (504) and a drive pulley (520) for dispensing and retrieving a deployment tether (418). The winch (424) also includes a reel motor (502) and a reel (496) on which the deployment tether (418) is spooled. The winch drive motor (504) and the reel motor (502) are synchronized to provide a take-up loop (546) formed of the deployment tether (418) which extends between the drive pulley (520) and the reel (496). A take-up arm (512) is connected between the take-up loop (546) and a position sensor (514) for determining the length (544) of the take-up loop (546). The deployment tether (418) is preferably provided by a cogged drive belt.

20 Claims, 22 Drawing Sheets

(56) References Cited

U.S. PATENT DOCUMENTS

| | | | | |
|---|---|---|---|---|
| 9,561,852 B1* | 2/2017 | Beaman | .................... | B64D 1/00 |
| 10,046,833 B2* | 8/2018 | Quappen | ................. | F03B 17/06 |
| 10,072,724 B2* | 9/2018 | Haugen | .................... | F03G 1/00 |
| 10,072,745 B1* | 9/2018 | Dorsey | .................... | F16H 21/44 |
| 10,252,800 B1* | 4/2019 | Dorsey | .................... | B66D 1/60 |
| 10,435,152 B1* | 10/2019 | Cook | .................... | B64C 39/022 |
| 2014/0263852 A1* | 9/2014 | Walker | .................. | B64C 39/024 |
| | | | | 244/53 R |
| 2015/0184637 A1* | 7/2015 | Vander Lind | ......... | F03D 7/0204 |
| | | | | 290/44 |
| 2015/0377405 A1* | 12/2015 | Down | .................. | B64C 39/024 |
| | | | | 73/865.8 |
| 2016/0083115 A1* | 3/2016 | Hess | ........................ | B64F 3/02 |
| | | | | 701/3 |
| 2016/0185456 A1* | 6/2016 | Ducharme | ........ | H02M 3/33523 |
| | | | | 244/39 |
| 2016/0309346 A1* | 10/2016 | Priest | .................... | B64C 39/024 |
| 2017/0043872 A1* | 2/2017 | Whitaker | ................. | B64D 1/18 |
| 2017/0240277 A1* | 8/2017 | Molnar | ................. | B64C 39/022 |
| 2017/0305538 A1* | 10/2017 | Iskrev | .................... | B64C 39/024 |
| 2018/0118374 A1* | 5/2018 | Lombardini | .............. | B60L 9/00 |
| 2018/0191439 A1* | 7/2018 | Morser | ................ | H04B 10/801 |
| 2018/0244400 A1* | 8/2018 | Gamble | .................... | B64F 1/02 |
| 2018/0273171 A1* | 9/2018 | Riedel | ................. | B64C 39/024 |
| 2018/0287833 A1* | 10/2018 | Kennedy | .......... | H04B 10/25754 |

* cited by examiner

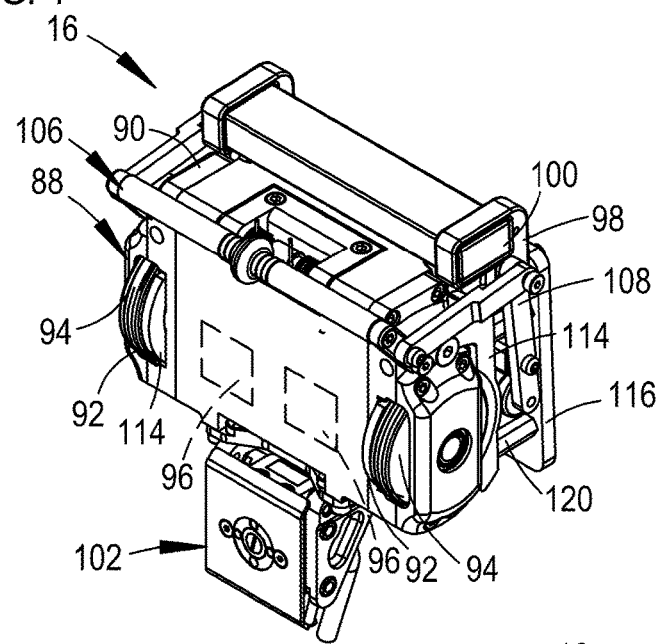
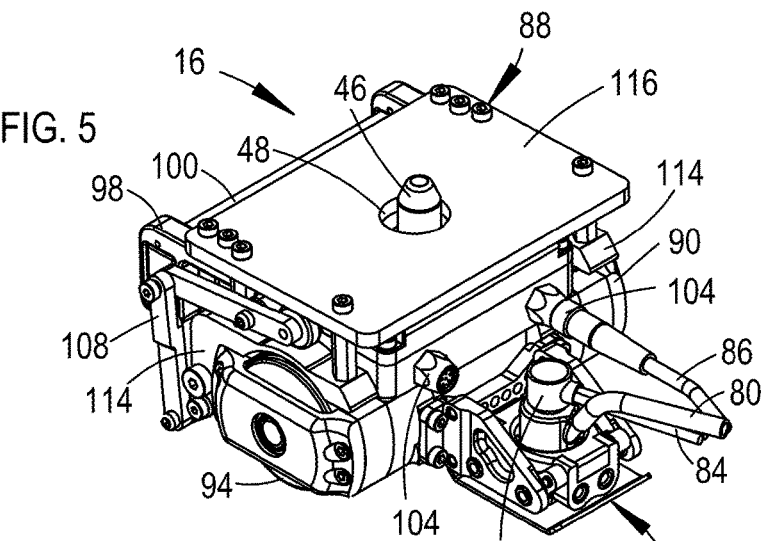
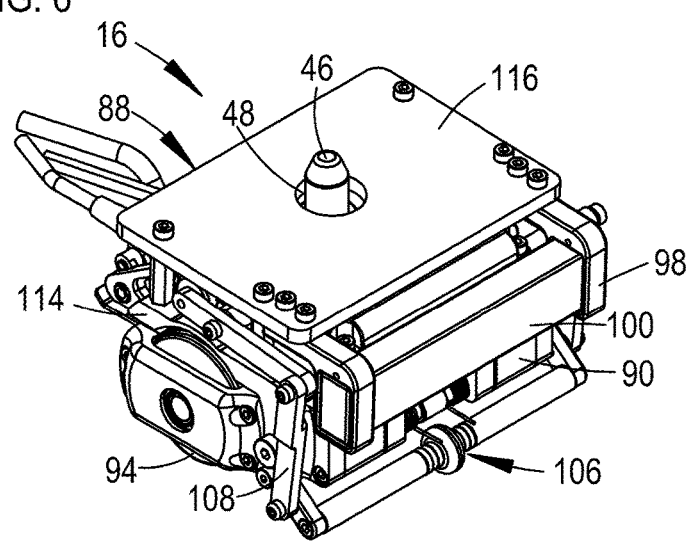

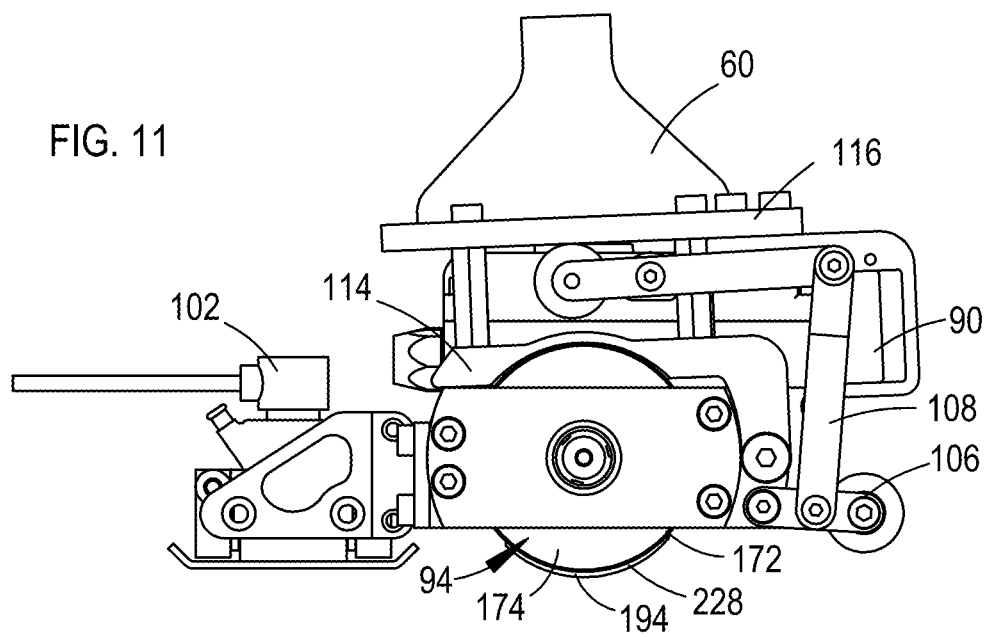
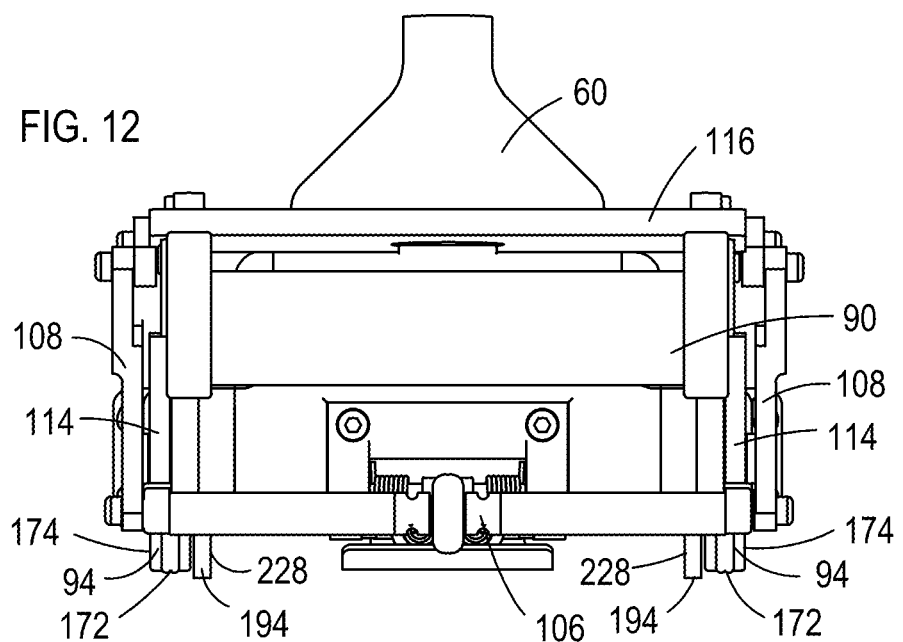
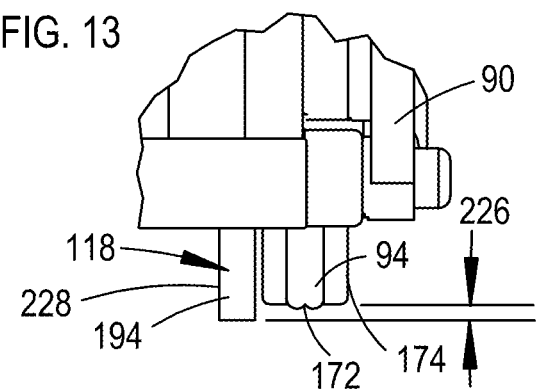

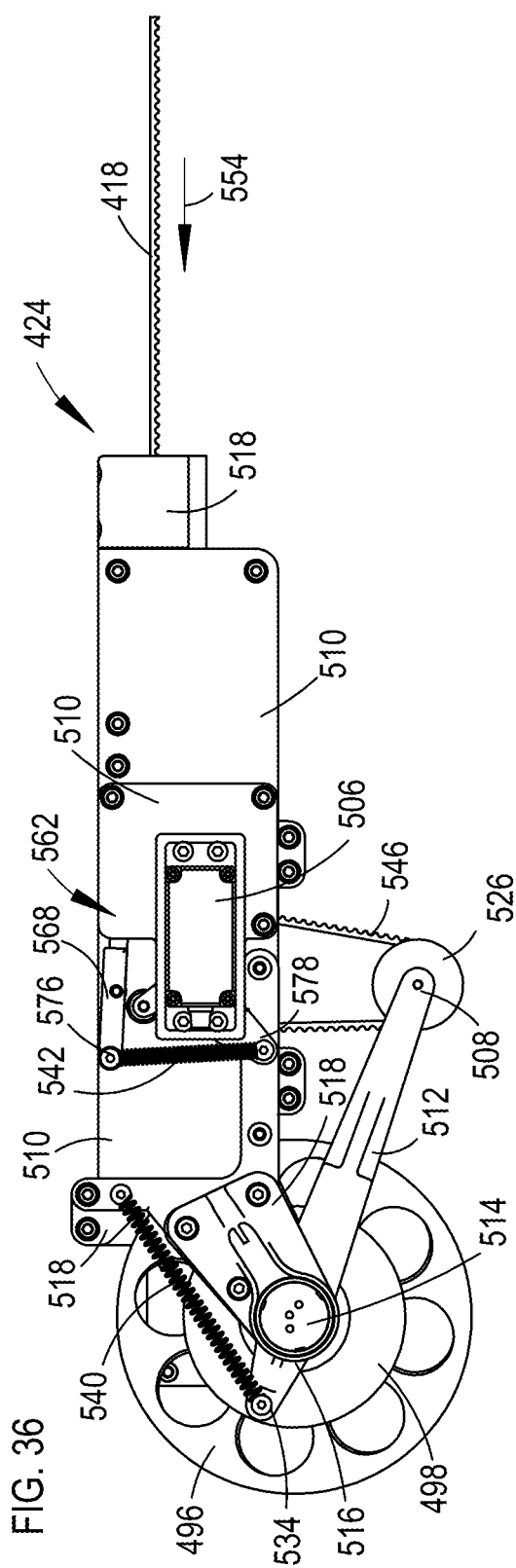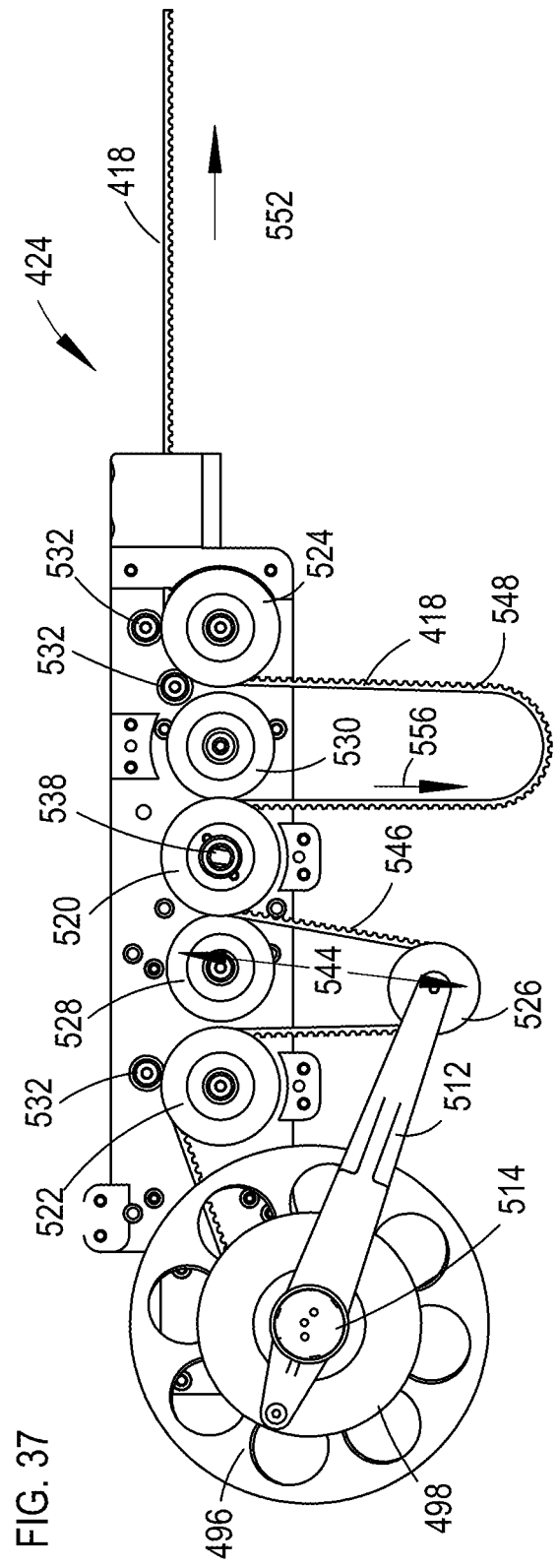

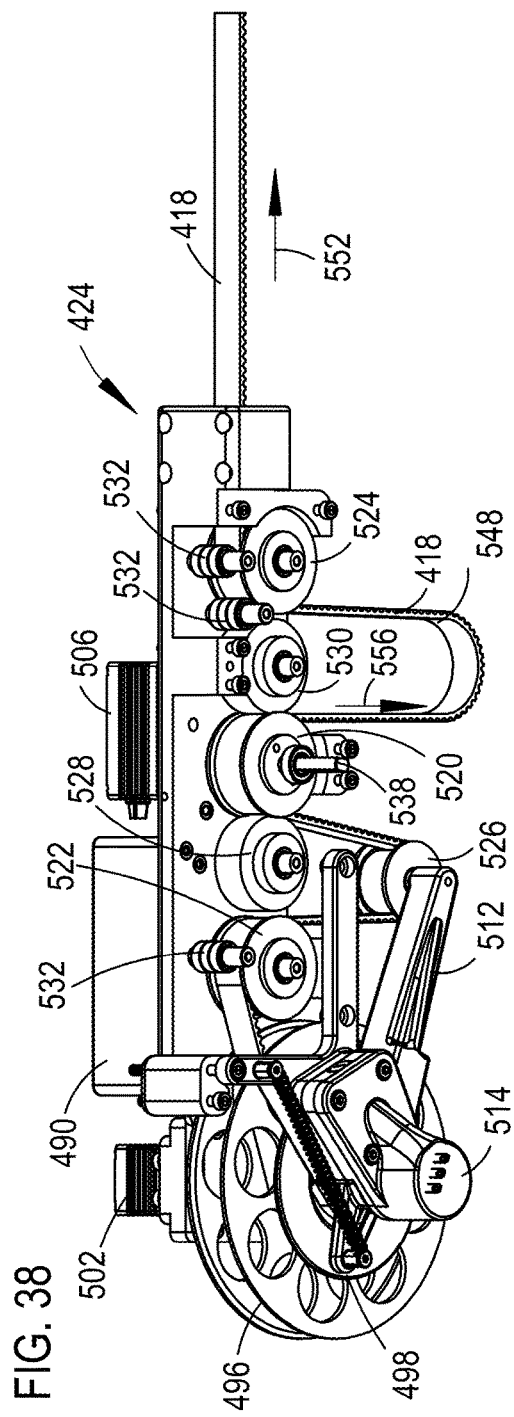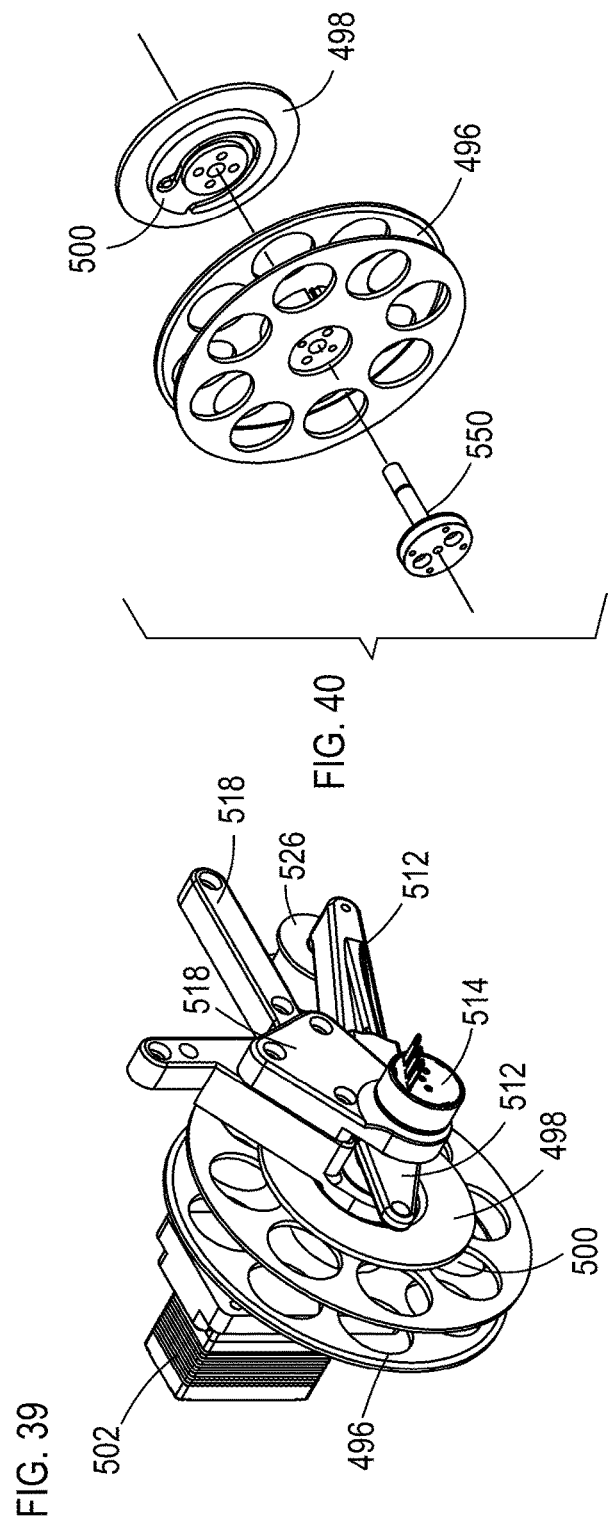

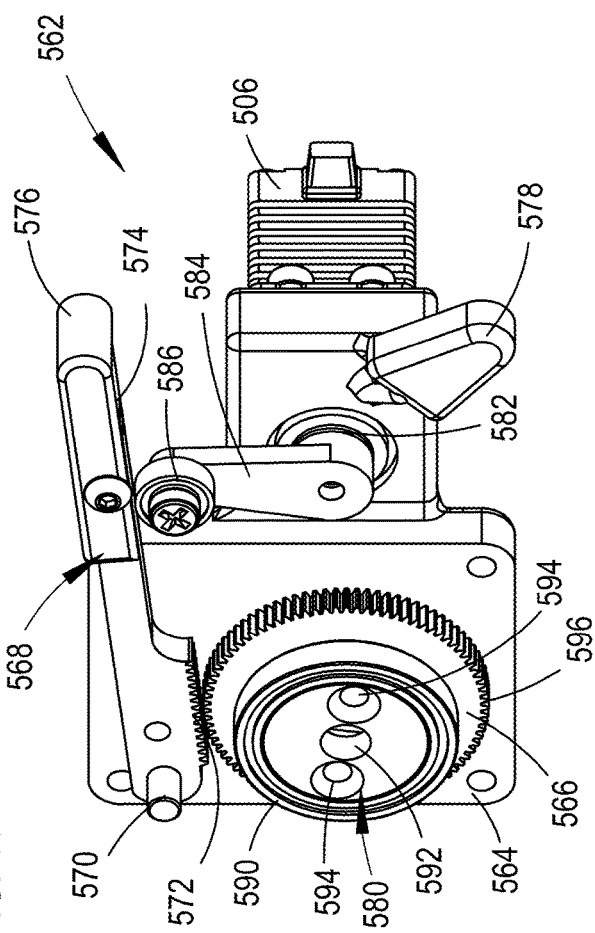
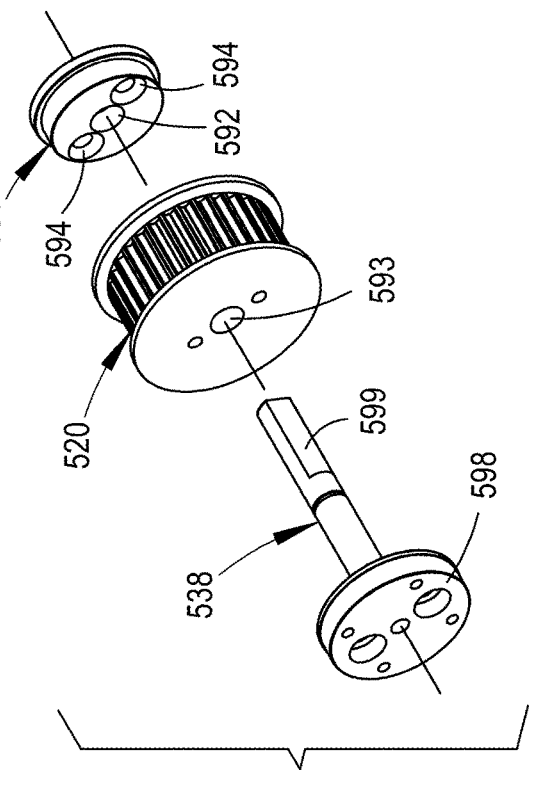
FIG. 41
FIG. 42

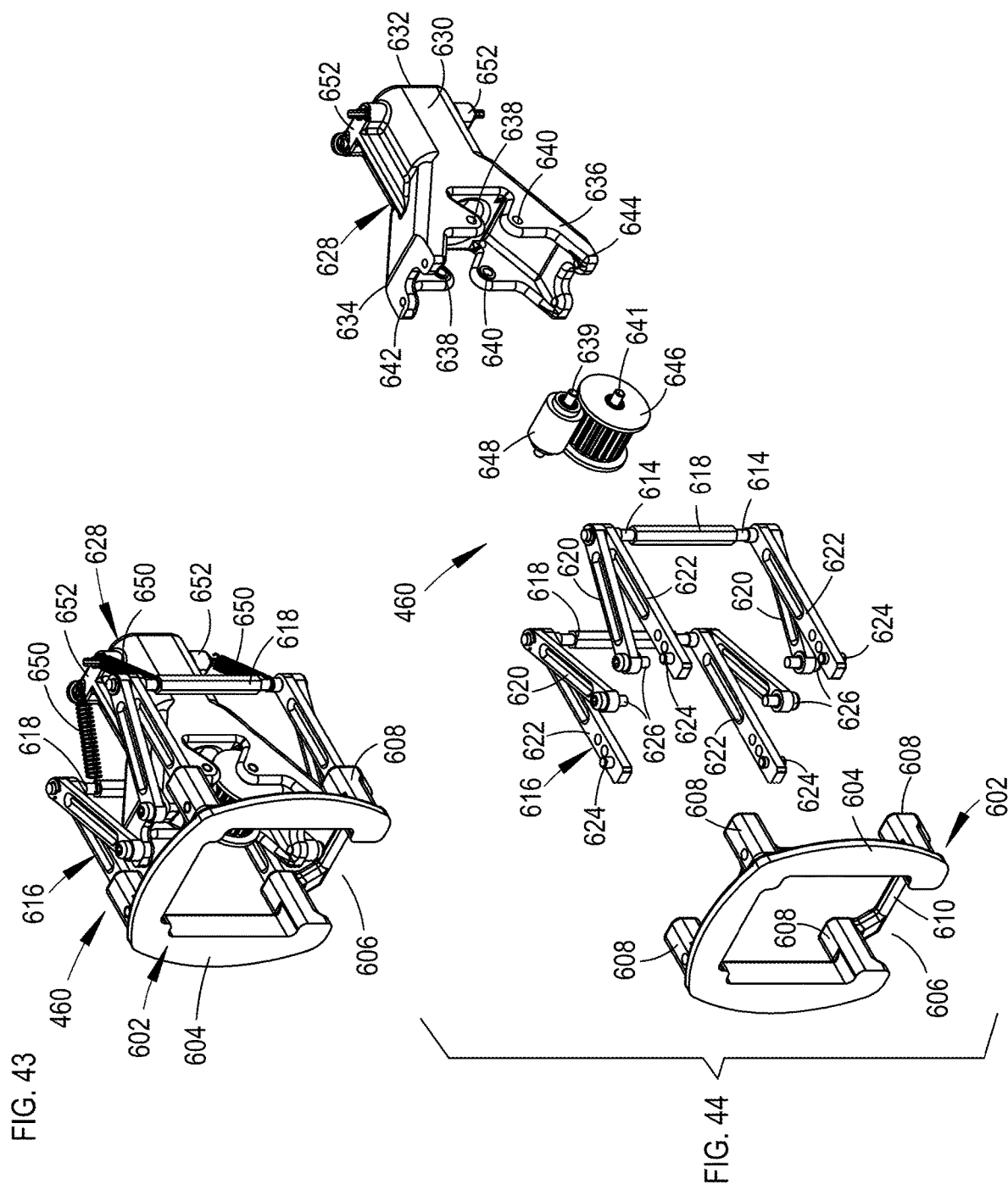

WINCH FOR AN AERIAL DRONE DEPLOYED NON-DESTRUCTIVE EVALUATION SCANNER

CROSS-REFERENCE TO RELATED APPLICATION

The present application is a continuation of U.S. application Ser. No. 16/292,243, filed Mar. 4, 2019, invented by Harvey Alan Dorsey, which is a continuation-in-part of U.S. application Ser. No. 16/127,218, filed Sep. 10, 2018, and invented by Harvey Alan Dorsey, which is a continuation-in-part of U.S. Provisional Patent Application No. 62/725,270, filed Aug. 31, 2018, and invented by Harvey Alan Dorsey, and a continuation-in-part of U.S. Pat. No. 10,072,745 B1, issued Sep. 11, 2018, having application Ser. No. 15/333,181, filed Oct. 24, 2016, and invented by Harvey Alan Dorsey, which is a conversion to a regular utility application of U.S. Provisional Patent Application No. 62/245,983, filed Oct. 23, 2015, and invented by Harvey Alan Dorsey.

TECHNICAL FIELD OF THE INVENTION

The present invention relates in general to devices for deploying and transporting non-destructive inspection scanners across surfaces of equipment under inspection, and in particular to a combination of an aerial drone and NDE scanner for field deployment.

BACKGROUND OF THE INVENTION

Non-Destructive Evaluation scanners ("NDE scanners") are commonly used for inspecting Equipment Under Test ("EUT") such as fuel tanks and chemical storage tanks in field industrial applications. NDE scanners typically have sensor probes which include ultrasonic transducers, electromagnetic transducers, or optical transducers, which emit measurement signals and receive return signals in response thereto. The emitted measurement signals are affected by the material of the EUT being inspected to provide the return signals which are representative of the physical conditions of the EUT.

Probes are typically mounted in floating platforms which will remain in fixed orientation relative to a surface of an EUT. When an NDE scanner is moving across the surface of an EUT along two axes of a plane, defined as the X-Y axes, it is desirable to constrain the NDE scanner probe to follow the surface and remain in contact with the surface such that a central axis of the probe will remain transverse or perpendicular to the surface. To accomplish this the NDE scanner probe is usually mounted to a shoe, generally similar to a skid plate, which will slide along the surface of an EUT. The NDE scanner probe shoe usually has forward edges and trailing edges which are arcuately shaped edges to allow the shoe to lift as obstructions are encountered. Various mechanisms and mechanical linkages have been used to allow a shoe to lift along a Z-axis as the probe moves along one or more of the X-Y axes. Several such mechanism are disclosed in U.S. Pat. No. 10,072,745, issued Sep. 11, 2018, having application Ser. No. 15/333,181, filed Oct. 24, 2016, and invented by Harvey Alan Dorsey, which is hereby incorporated by reference as if fully set forth herein It is also desirable that an NDE scanner be deployed by means of aerial drones. However, aerial drones do not provide sufficiently stable platforms during flight for use with the various types of sensor probes noted above for NDE scanners. Aerial drones are able to reach locations relative to EUTs which are difficult for a person to access manually.

SUMMARY OF THE INVENTION

An aerial drone deployed NDE scanner is disclosed having a forwardly extending deployment arm through which a cable passes. A winch is mounted to the aerial drone and powered by an electric motor. The cable provides a deployment tether which is wound on the winch and has a terminal end which is secured to the NDE scanner. The NDE scanner is initially mounted to the aerial drone on the end of the deployment arm and held in place by the cable. The NDE scanner is then flown to an initial location on the EUT for inspection. The NDE scanner is then placed on the EUT and magnetically engages against a surface of the EUT, and a section of the cable is spooled from the winch which releases the NDE scanner from the end of the deployment arm. This allows the aerial drone and the NDE scanner to be operated relatively independently, without movement of the drone affecting the orientation of the NDE scanner relative to the EUT and the NDE scanner to be moved independently of the aerial drone. Preferably, an umbilical connection extends between the aerial drone and the NDE scanner, through which power, data and couplant materials may pass between the aerial drone and the NDE scanner. The NDE scanner is later retrieved by reeling the section of cable onto the winch until the deployment arm engages against the NDE scanner, and the NDE scanner may then be removed from the EUT by the aerial drone.

Preferably a smaller, light weight NDE scanner is provided for deployment and retrieval by means of the drone than those typically provided for climbing along an EUT. An NDE scanner is disclosed having a powered cart with two magnetic wheels, one or more drive motors for powering the wheels to turn, and a power supply means to operate the drive motors. The powered cart has a stand-off mechanism which is selectively operated to engage the magnetic wheels of the powered cart with the surface of the EUT, coupling the magnetic wheels to the EUT. The stand-off mechanism is also selectively operated to displace the magnetic wheels from engaging against the surface of the EUT, allowing the powered cart of the NDE scanner to be more easily removed from the surface of the EUT.

The scanner has a sensor probe mounted to a yoke by four sets of two spaced apart offset pins, with one set extending between the sensor probe and the yoke on each four sides of the sensor probe. Each set of the spaced apart offset pins are mounted with spacings between the offset pin pairs being more closely spaced at the lower elevation of the pins than at the upper elevations of the pins. The four sets of two spaced apart offset pins provide for constrained rotation about an X-axis and a Y-axis, when traveling in the X-axis direction or the Y-axis direction, and prevent tipping of a sensor probe. The offset pins are preferably configured such that the center of rotation for the probe is at the bottom of the probe. The sensor probe is pivotally mounted such that it is free to rotate in an angular direction about an X-axis, which is transverse to a direction of travel, and about a Y-axis, which is along the direction of travel. Movement of the sensor probe is constrained to travel in an arc at a constant distance from an axis of the wheels, which contain positional sensors.

In an alternative embodiment a winch is provided having a frame, a winch drive motor and a winch drive pulley coupled to the winch drive motor for dispensing and retrieving a deployment tether from the winch. The deployment tether is preferably provided by a drive belt which is flexible and non-continuous, having two terminal ends. The drive belt is preferably a cogged drive belt, but yet other embodiments may be provided by smooth drive belts. A deployment tether reel is provided for winding the deployment tether onto and spooling there-from, powered by a reel motor. A control panel provides control of the winch drive motor and the reel motor, synchronizing the winch drive motor and the reel motor. A take-up arm is pivotally mounted to the winch frame and has an outward end on which a take-up idler is disposed for engaging the deployment tether. The take-up idler is disposed between the deployment tether reel and the winch drive pulley. A take-up loop formed of the deployment tether is engaged by the take-up idler and extends about the take-up idler. A position sensor is mounted to the frame of the winch and pivotally mounts the take-up arm to the frame. The position sensor is preferably an encoder or a potentiometer which is used to determine an angular displacement of the take-up arm from which a length of the take-up loop is determined. The control panel synchronizes the respective speeds of the reel drive motor and the winch drive motor to provide compliance between said deployment tether being spooled from the deployment tether reel and being dispensed from the winch by the drive pulley, substantially maintaining the length of the take-up loop. A bias spring preferably extends between a second end of the take-up arm and the frame of the winch to press the take-up idler into the take-up loop.

In the alternative embodiment, a deployment arm is provided with a dock mounted to an outward end of the deployment arm. The dock has a dock bracket and a platform which are moveably connected together to provide compliance during retrieval and deployment of the powered cart. An umbilical tether extends between the frame of the winch and an umbilical connection. The winch includes an umbilical tether reel on which said umbilical tether is spooled for deployment and retrieval. The umbilical tether is reeled inward and onto said umbilical tether reel when the powered cart is being retrieved and the umbilical tether is spooled outward and from the umbilical tether reel when the powered cart is deployed. This is preferably accomplished by mounting the umbilical tether reel directly to the deployment tether reel in fixed relation for rotating therewith. This results in moving the center of gravity of the umbilical to a position which is located more underneath the aerial drone, causing the combined center of gravity of the umbilical and aerial drone to be located in a position which is located more underneath the aerial drone when the cart is secured to the drone. When the cart is no longer secured to the drone and the tethers are deployed into extended positions, the combined center of gravity of the umbilical and aerial drone are located in positions which are in extended, forward positions.

DESCRIPTION OF THE DRAWINGS

For a more complete understanding of the present invention and the advantages thereof, reference is now made to the following description taken in conjunction with the accompanying Drawings in which FIGS. 1 through 47 show various aspects for an aerial drone deployed test unit as set forth below:

FIG. 1 is a front, elevation view of an aerial drone deployed test unit which includes an aerial drone and an NDE scanner, showing the NDE scanner after deployment and during use to scan a surface of an EUT;

FIG. 2 is a perspective view of the aerial drone;

FIG. 3 is a perspective view of a test unit attachment mounted to the aerial drone shown in FIG. 2, adapting the aerial drone for use in deploying the NDE scanner;

FIG. 4 is a perspective view of an inward side of the NDE scanner;

FIG. 5 is a perspective view of an outward side of the NDE scanner;

FIG. 6 is a second perspective view of an outward side of the NDE scanner;

FIG. 7 is a partially exploded view of a scanner cart of the NDE scanner;

FIG. 8 is a partially exploded view of a stand-off mechanism and a counter force assembly of the NDE scanner cart;

FIG. 9 is a side elevation view of the scanner cart shown in a deployed position, with the wheels of the scanner cart and the counter force assembly engaging the surface of the EUT;

FIG. 10 is an end view of the scanner cart of FIG. 9, shown in a deployed position, with the wheels of the scanner cart and the counter force assembly engaging the surface of the EUT;

FIG. 11 is a side elevation view of the scanner cart shown in a retrieval ready position, with the standoff member deployed to lift wheels of the scanner cart and the counter force assembly raised from engaging the surface of the EUT;

FIG. 12 is an end view of the scanner cart of FIG. 11, shown in a retrieval ready position, with the standoff member deployed to lift wheels of the scanner cart and the counter force assembly raised from engaging the surface of the EUT;

FIG. 13 is an enlarged portion of the end view of the scanner cart of FIG. 12, showing the standoff member after being deployed to extending beyond the wheels of the scanner cart;

FIG. 14 is a perspective view of a probe assembly for the NDE scanner;

FIG. 15 is an exploded view of the probe assembly for the NDE scanner;

FIG. 16 is a perspective view of a first type of the offset pins which are preferably L-shaped;

FIG. 17 is a perspective view of a second type of the offset pins which are also preferably L-shaped;

FIG. 18 is a perspective view showing the configuration in which the first and second types of offset pins are mounted together to provide a dual gimbal configuration for constrained movement around two axes;

FIG. 19 is a first side elevation view of a shoe of the probe assembly mounted to a yoke, supported from the yoke in a cantilever arrangement by a mated pair of the offset pins;

FIG. 20 is a second side elevation view of the shoe, the yoke and the offset pins, showing the offset pins constraining rotation of the shoe in a first direction;

FIG. 21 is a third side elevation view of the shoe, the yoke and the offset pins, showing the offset pins constraining rotation of the shoe in a second direction;

FIG. 22 illustrates a path that a rotational axis of the shoe travels during the movement shown in FIGS. 19, 20 and 21, constrained by the mated pair of offset pins;

FIG. 23 is a side elevation view showing embodiment in which the configuration of mated offset pins are changed such that the shoe is constrained to rotate along a path located further away from the offset pins than the end of the shoe;

FIG. 24 is a side view of an alternative NDE scanner having a motor and cam mounted to the scanner cart for actuating the engagement member, or push plate, showing the cam and push plate in released positions;

FIG. 25 is a second side view of the alternative NDE scanner having a motor and cam mounted to the scanner cart for actuating the engagement member, or push plate, showing the cam and push plate in actuated positions;

FIG. 26 is an end view of the alternative NDE scanner having a motor and cam mounted to the scanner cart for actuating the engagement member, or push plate, showing the counter force assembly in a lifted position after the cam and push plate are disposed in actuated positions;

FIG. 27 is a partially exploded view of an alternative embodiment to the NDE scanner showing features of an alternative stand-off mechanism for selectively deploying and selectively retrieving the NDE scanner relative to the EUT;

FIG. 28 is a side-elevation view of the alternative embodiment to the NDE scanner during deployment and retrieval, showing the alternative stand-off mechanism in an extended position to lift the wheels of the NDE scanner from the EUT;

FIG. 29 is a side-elevation view of the alternative embodiment to the NDE scanner during deployment and retrieval, showing the alternative stand-off mechanism in an intermediate position with both the stand-off mechanism and the wheels of the NDE scanner contacting the EUT;

FIG. 30 is a side-elevation view of the alternative embodiment to the NDE scanner during deployment and retrieval, showing the alternative stand-off mechanism in a retracted position with the wheels of the NDE scanner fully engaging the EUT and the stand-off mechanism retracted into a housing of the NDE scanner;

FIG. 31 is a perspective view of a second aerial drone;

FIG. 32 is an exploded, perspective view of the second aerial drone;

FIG. 33 is an exploded perspective of the second test unit attachment;

FIG. 34 is a perspective view of a left side of the second test unit attachment;

FIG. 35 is a perspective view of the right side of a second winch for use with the second aerial drone to deploy and retrieve the NDE scanner;

FIG. 36 is a side elevation view of the left side of the second winch;

FIG. 37 is a side elevation view of the left side of the second winch after removing winch housing cover;

FIG. 38 is a perspective view, looking downward on the left side of the second winch with the housing cover removed to show the belt spool and the umbilical rope spool;

FIG. 39 a perspective view of a deployment tether reel, an umbilical reel and a reel motor 502;

FIG. 40 is an exploded view of the reel drive shaft, the deployment tether reel, and the umbilical tether reel;

FIG. 41 is a perspective view of a brake module for the second winch;

FIG. 42 is an exploded perspective view of a drive shaft, a drive pulley 520, and a mounting disc;

FIG. 43 is a perspective view of a gimbaled scanner cart dock;

FIG. 44 is an exploded, perspective view of the gimbaled scanner cart dock;

FIG. 45 is a perspective view of the gimbaled scanner cart dock;

FIG. 46 is a top view of the gimbaled scanner cart dock; and

FIG. 47 is a right side elevation view of the gimbaled scanner cart dock.

DETAILED DESCRIPTION OF THE INVENTION

Figure 1:
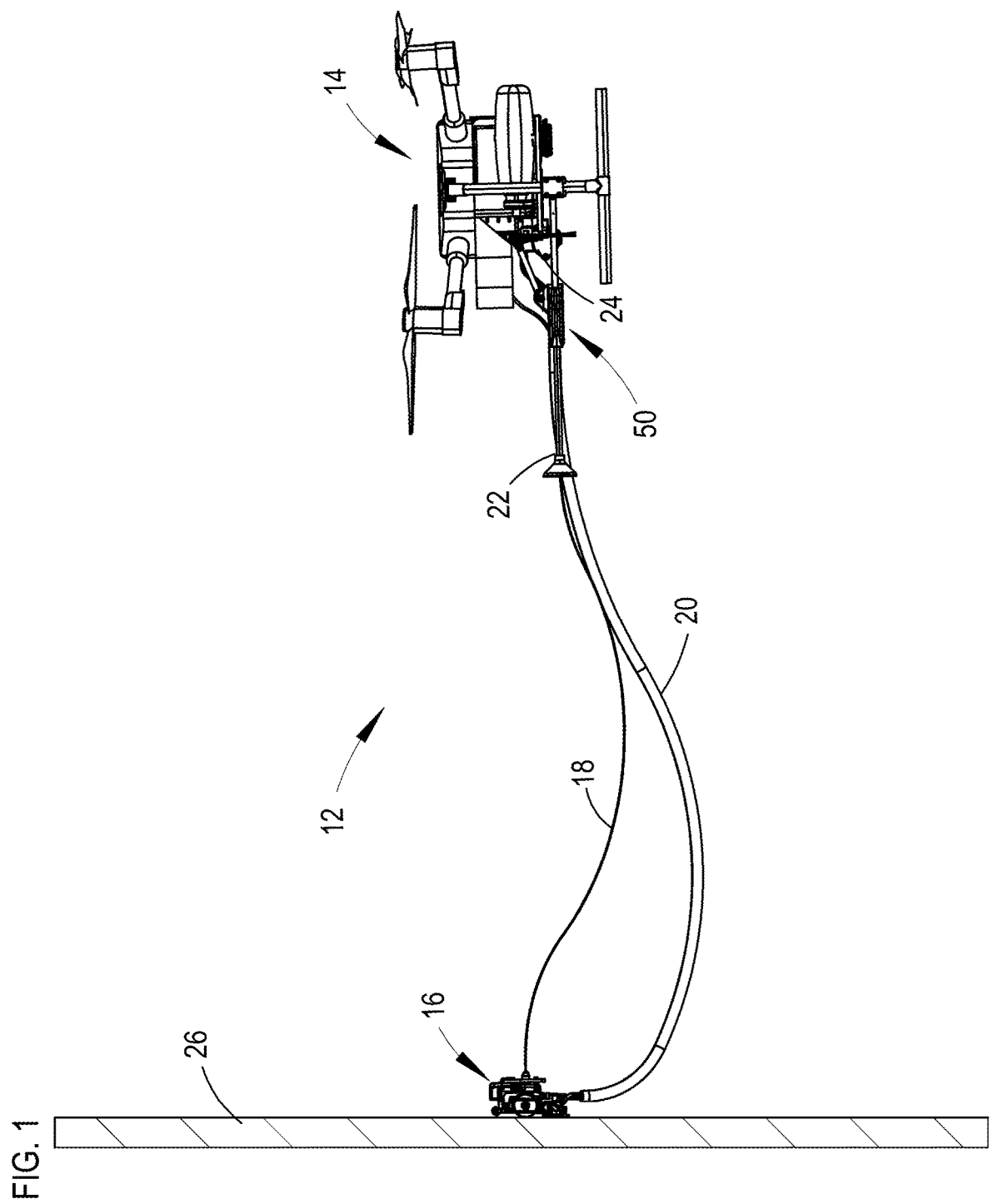

FIG. 1 is a front, elevation view of an aerial drone deployed test unit 12, showing an NDE scanner 16 after deployment from the drone 14 to scan an EUT 26. The test unit 12 includes both a commercially available aerial drone 14 and an NDE scanner 16. The aerial drone 14 has been modified for use by mounting a test unit attachment 50 thereto. The test unit attachment 50 is connected to the NDE scanner 16 by a deployment line 18 and an umbilical connector 20. A deployment arm 22 extends forward from the test unit attachment 50, with a terminal end which is spaced apart from the aerial drone 14. The deployment line 18 is preferably a cable which is selectively dispensed from and spooled onto a winch 24 mounted to test unit attachment 50 affixed to the aerial drone 14. The deployment line 18 is spooled from the winch 24 after the NDE scanner 16 is positioned on the EUT 26, allowing the aerial drone 14 and the NDE scanner 16 to move independent of one another. The NDE scanner 16 is retrieved by the aerial drone 14 approaching the NDE scanner 16 as the line 18 is spooled onto the winch 42. In some embodiments a second winch may be added for spooling the umbilical connector 20. In the present embodiment a second winch is not used, but instead the umbilical connector 20 will remain slack during use.

Figure 2:
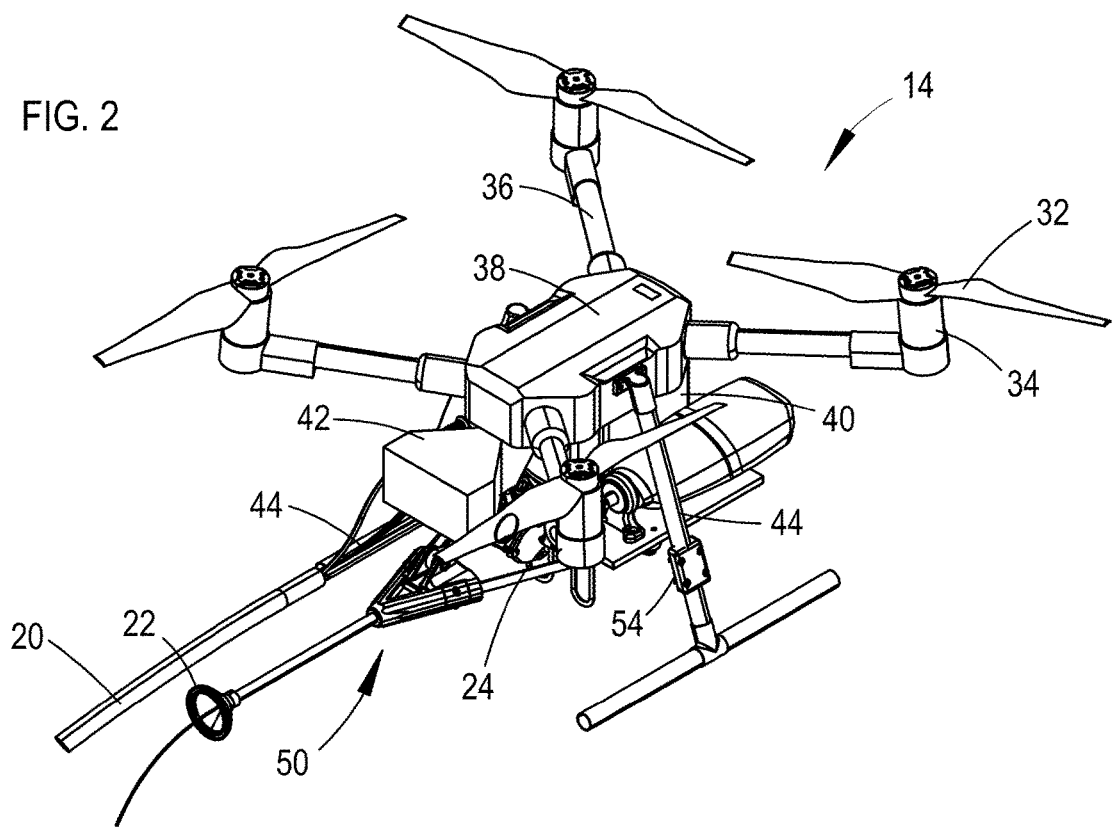

FIG. 2 is a perspective view of the aerial drone 14 with the test unit attachment 50 mounted to the drone 14. The aerial drone 14 is preferably a commercially available drone, such as a Matrice 200 Series drone available from SZ DJI Technology Co., Ltd. of Shenzhen, China. The aerial drone 14 has rotors 32 coupled to respective motors 34, which are mounted to the terminal ends of frame arms 36. A control section 38 is provided for housing control electronics for the drone 14. Batteries 40 are mounted underneath the control section 38. A vision system 42 is mounted to a forward end of the control section 38 and the batteries 40. Landing gear 44 extends downward from the control section 38 and provides a frame for mounting the test unit attachment 50 to the aerial drone 14.

Figure 3:
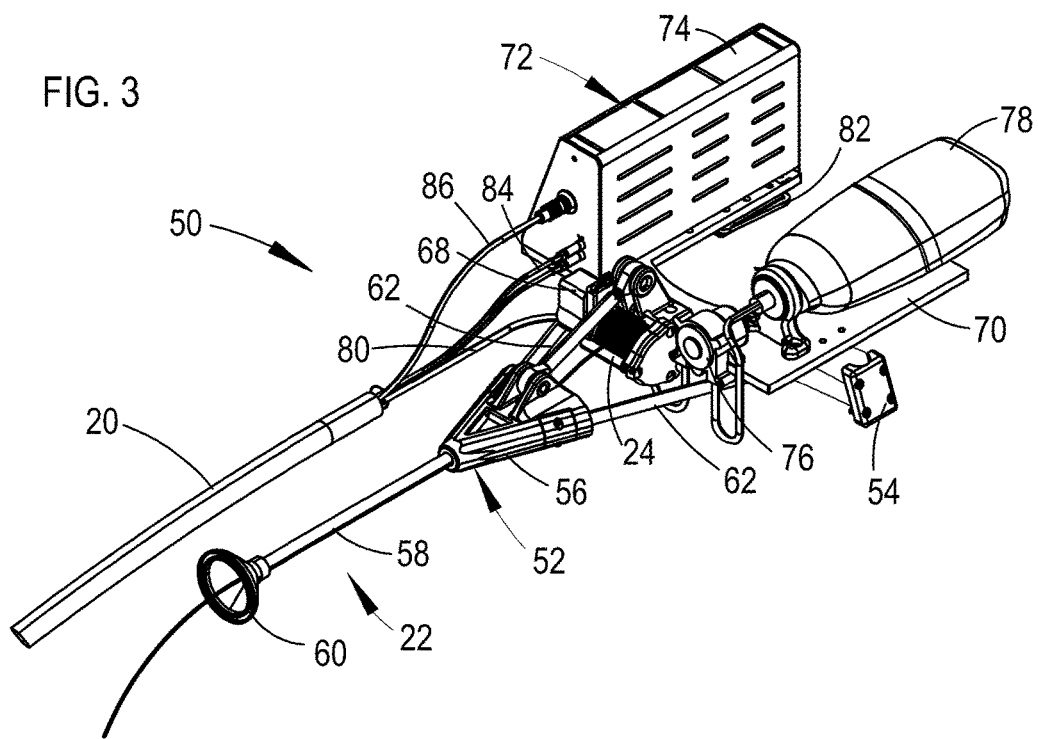

FIG. 3 is a perspective view of a test unit attachment 50 mounted to the aerial drone 14 shown in FIG. 2, for adapting the aerial drone 14 for use in deploying and retrieving the NDE scanner 16. The test unit attachment 50 has a frame 52 which is secured to the landing gear 44 by two frame mounting brackets 54 (one shown). A connector fitting 56 is provided for coupling the deployment arm 22 to the frame 52 and feeding the deployment line 18 through the line guide 60, the extension tube 58 and the connector fitting 56 to the winch 24. The deployment arm 22 is provided by the extension tube 58 with the line guide 60 which are mounted to the forward terminal end of the extension tube 58. The line guide 60 is bell shaped, preferably frusto-conical shaped, for aiding in directing the deployment line 18 into the extension tube 58 without having sharp bends in the line 18. The line guide 60 is also sized to provide a surface of significant size to fit square against the plate 116 which provides the top of the scanner cart 88, with the deployment line 18 pulling scanner cart 88 firmly against the outer rim of the conical-shaped line guide. Connector tubes 62 are part of the frame 52 and extend from the connector fitting 56 to respective ones of the two frame mounting brackets 54 (one shown). The deployment line 18 feeds through the line guide 60, the extension tube 58 and the connector fitting 56 to the winch 24. The deployment line 18 is preferably enclosed within the extension tube 58 and the connector fitting 56. A winch motor 68 is provided for powering the winch 24.

The test attachment unit 50 further includes a mounting plate 70, which is preferably U-shaped for fitting around a forward end of the aerial drone 14. A control panel 72 is mounted on one side of the mounting plate 70 for housing control electronics and providing data storage for the NDE scanner. The control panel 72 may be wirelessly coupled to the NDE scanner by means of radio signals, by means of conventional data signal lines extending through the umbilical 20, or a combination of both. Vents 74 are provided on the control panel 72 for cooling. When an ultrasonic probe is used with the NDE scanner 16, a couplant pump 76 may be located on the mounting plate 70 for pumping ultrasonic couplant fluids to the NDE scanner 16 from a couplant reservoir 78 mounted to the test unit attachment 50. The sonic couplant fluid passes from the reservoir 78, through the couplant pump 76 and through the couplant tubing 80, which passes through the umbilical 20 to the probe assembly 102 shown in FIG. 5. A probe data and power cable 84 passes from the control panel 72, through the umbilical 20 and to the probe assembly 102 shown in FIG. 5. A wireless communication module 82 is mounted to the underside of the mounting plate 70, beneath the control panel 72, and transmits data to a remote computer. A cart data cable 86 passes from the control panel 72, through the umbilical 20 and to the scanner cart 88 shown in FIG. 5. In other embodiments, the cable 86 may also provide power to the scanner cart 88.

FIGS. 4 through 6 are perspective views of the NDE scanner 16 taken from three different directions. FIG. 4 is a view of an inward side of the NDE scanner 16. FIGS. 5 and 6 are views of two different outward sides of the NDE scanner 16. The NDE scanner 16 includes a powered scanner cart 88 having a cart housing 90 and wheels 94, with the wheels 94 extending through the cart housing 90 in rectangular-shaped apertures 92. The wheels 94 are magnetic for operating the powered scanner cart 88 on vertical metal surfaces of the EUT 26. Drive motors 96, preferably provided by closed-loop DC servo motors, are connected to respective ones of the wheels 94, such that the cart 88 is steerable by selectively controlling the angular direction and speed of the motors 96 and the respective wheels 94. Position sensors are preferably integrated into the drive motors 96, and provide outputs to the scanner cart 88 and the control panel 72. A battery holder 98 is mounted to one side of the cart housing 90, and a battery 100 is secured in the battery holder 98. In some embodiments, power may instead be provided through the umbilical connector 20 rather than having a battery holder 98 and battery 100 mounted to the cart 88. A probe assembly 102 is mounted to one side of the cart housing 90 for positioning a sensor probe 232 relative to the EUT 26. A counter force assembly 106 is disposed on an opposite side of the housing 90 from the probe assembly 102, to press against the surface of the EUT 26 and provide a counter force to balance the weight of the probe assembly 102. Two lift mechanisms 108 extend on opposite sides of the housing 90 for lifting the counter force assembly 106 during deployment and retrieval of the NDE scanner 16 relative to the surface of the EUT 26. A stand-off mechanism 114 is incorporated into the cart 88 for assisting in deployment onto the surface of the EUT 26 and removal of the powered cart 88 from the EUT 26. A cable coupling 46 extends through a coupling port 48 formed into the push plate 116 and secures the cart 88 to the deployment line 18, which extends to the aerial drone 14. The push plate 116 provides an engagement member for the deployment arm 22 and line guide 60 of the aerial drone 14.

Figure 7:
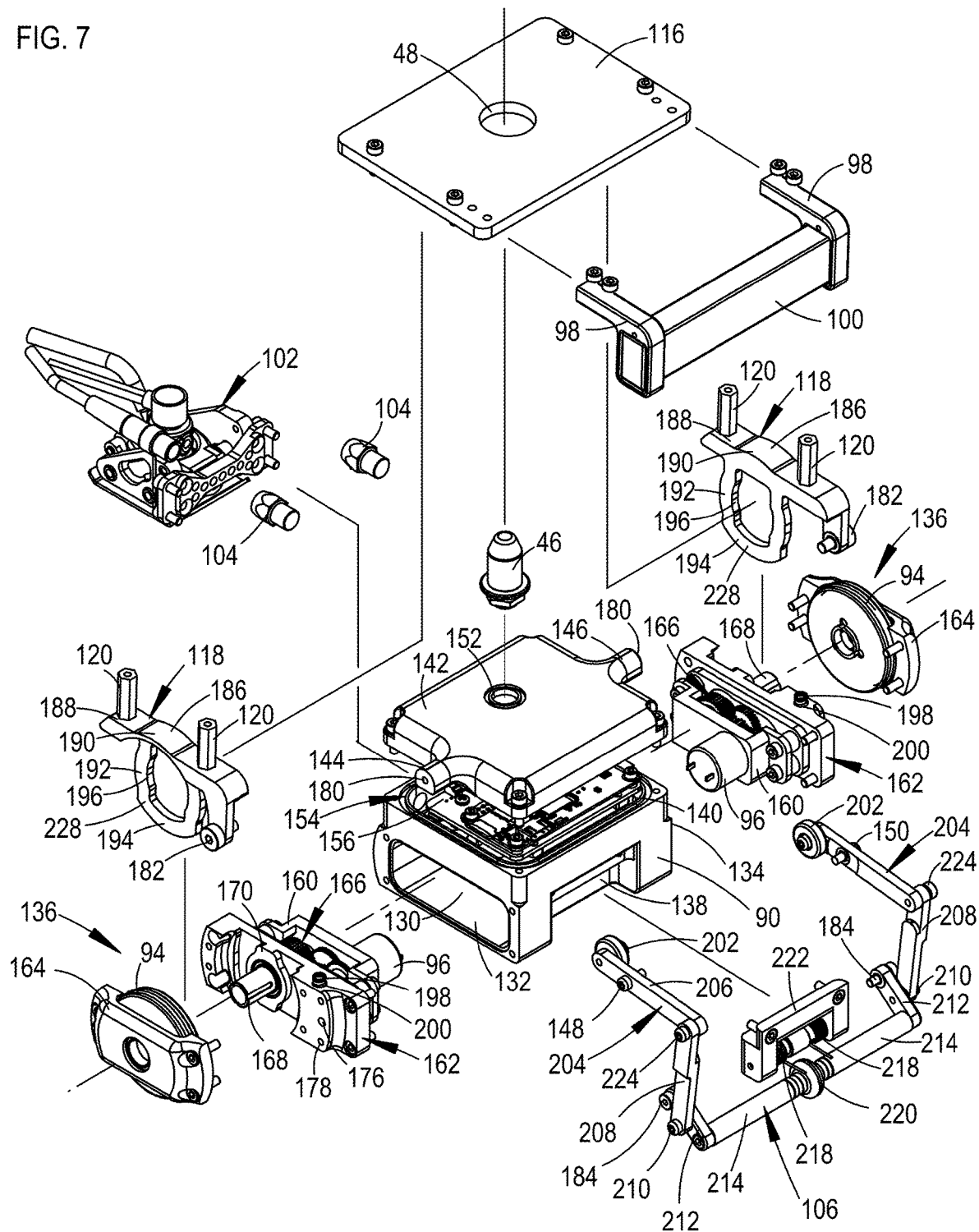

FIG. 7 is a partially exploded view of the scanner cart 88 of the NDE scanner 16. The scanner cart 88 has a cart housing 90. The probe assembly 102 and two connection fittings 104 are mounted to one side of the housing 90. The connection fittings 104 provide a connection for connecting the cable 86 to the scanner cart 88. The cable 86 extends through the umbilical connector 20 to the aerial drone 14, and in some embodiments may provide power to the scanner cart 88 in addition to a data and control connection. In other embodiments, wireless communication may be used for controlling operation of the scanner cart 88 and the cable 86 may be used for providing power. The cart housing 90 includes an interior cavity 130 and two open sides 132 and 134. Two motor and wheel assemblies 136 provide drive packs which are mounted in respective ones of the open sides 132, 134 of the cart housing 90. A recess 138 is provided into the side of the housing 90 for receiving and mounting a mounting bracket 222 for a mounting pin and two torsion bias springs 218 for the counter force assembly 106. The housing 90 has an open top 140 to which a cover 142 provides an enclosure which is secured to the housing 90 in a fixed position. The cover 142 has a mounting aperture 152 to which a cable coupling 46 is mounted for securing to a terminal end of the deployment line 18. The cable coupling 46 extends through the coupling port 48 which is disposed in a central portion of the push plate 116. The cable coupling 46 and the mounting aperture 152 are centrally located in the cover 142 in a position near the axis for the wheels 94. The cover 142 also includes mounting bosses 144 and 146 for receiving pivot pins 148 and 150, respectively. The pivot pins 148 and 150 provide stationary pivot points for an upper end of the lift mechanism 108.

A control section 154 is provided in an upper portion of the interior cavity 130 and houses circuitry 156. The circuitry 156 preferably comprises electronic circuit boards which have one or more microprocessors and related memory for controlling operation of the scanner cart 88, and in some embodiments instrumentation for the measurement probe of the probe assembly 102. The control circuitry 156 also preferably includes data storage for collected test data from the probe assembly 102. In other embodiments, the control circuitry 156 may be provided within the control panel 72 mounted to the aerial drone 14 and electrically connected to the NDE scanner 16 through the umbilical connector 20, rather than being mounted within the control section 154. The control section 154 may also enclose radio signal receivers and transmitters for wirelessly transmitting data to and receiving control signals from the control panel 72 mounted to the aerial drone 14, or directly to a computer located on the ground. Various combinations of wired and wireless communication may be used.

The motor and wheel assemblies 136 are each drive packs which include a respective one of the motors 96, a motor bracket 160, a drive assembly support 162, a wheel support 164, a drive train 166, the drive shaft 168, bearings 170 and the wheel 94. The two motor and wheel assemblies 136 are mounted to the housing such that one of the assemblies extends a respective one of the open sides 132 and 134 of the cart housing 88. The drive assembly supports 162 are brackets which are mounted directly to one of the open sides of the cart housing 88, preferably with threaded fasteners. Each of the two motor brackets 160 are mounted directly to an interior side of a respective one of the drive assembly supports 162. The motors are mounted to the motor brackets 160. The drive trains 166 with associated gears, bearings and mounting shafts are mounted between the supports 162 and the motor brackets 160. A drive shaft 168 extends outward of the support 162 and through a bearing 170. The wheels 94 are mounted to the drive shafts 168 and held in place by the wheel supports 164 which contain outer wheel bearings. The wheel supports 164 are preferably secured to the drive assembly support 162 by threaded fasteners, as shown in FIG. 7. Pivot pin mounting holes 176 and 178 are preferably provided by threaded holes which receive the pivot pins 182 and 184, respectively. The pivot pin 182 provides a stationary pivot point for the L-shaped arm 186 providing a standoff member for the standoff mechanism 114 shown in FIG. 5. The pivot pin 184 provides a stationary pivot point for the counter force assembly 106. Each of the drive assembly supports 162 has an upwardly facing socket 200 for receiving a bias spring 198 for a respective standoff mechanism 114. The bias springs 198 are preferably coil springs which engage an underside of the L-shaped arm 186 of the stand-off members 118 to push the stand-off members 118 in an upward direction, as viewed in FIG. 7. This spring force combines with the torsion springs 218 in the counter force assembly 106.

Figure 8:
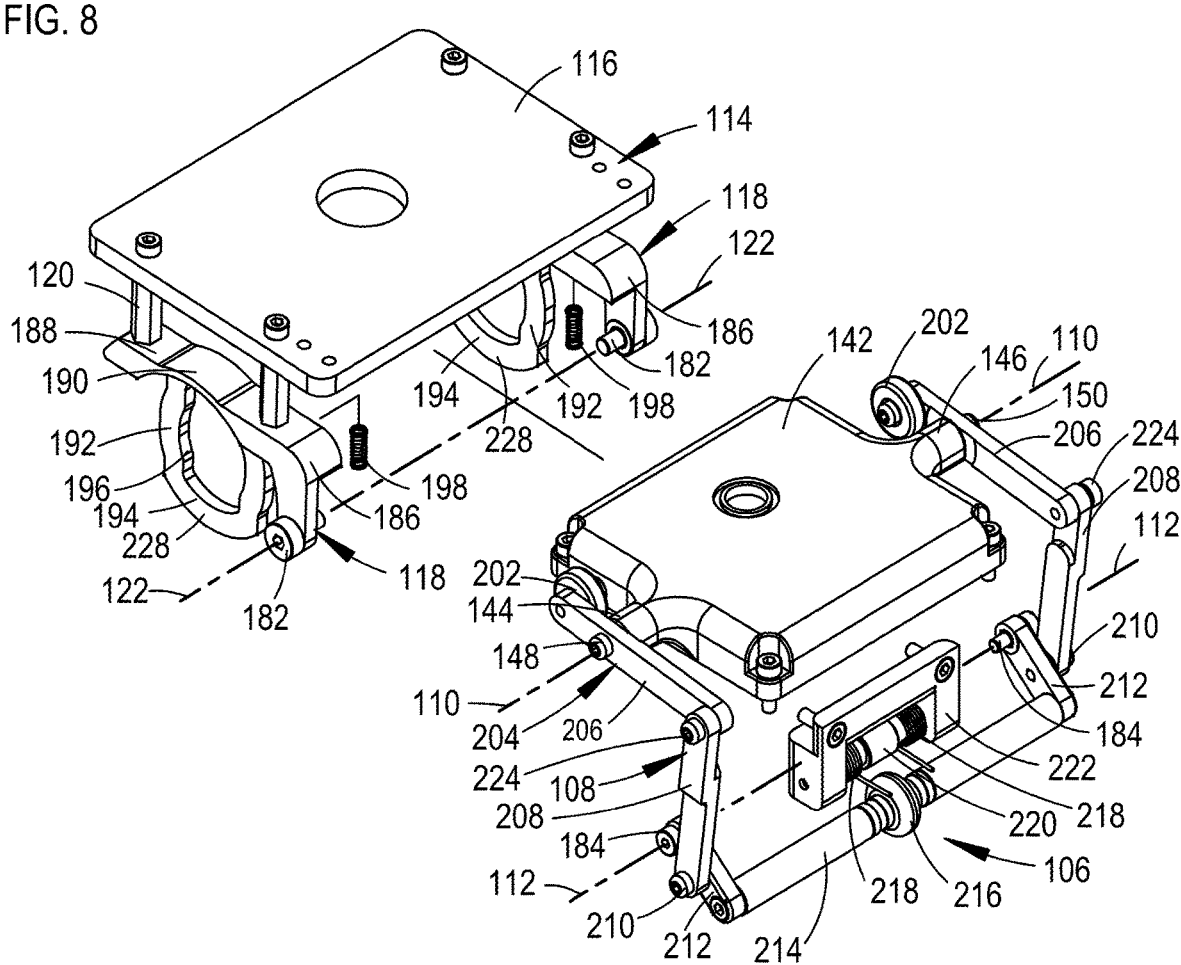

FIG. 8 is a partially exploded view of a stand-off mechanism 114 and a counter force assembly 106 of the scanner cart 88. Referring to FIGS. 7 and 8, the standoff mechanism 114 includes both the standoff members 118 and the push plate 116, which provides an engagement member. The push plate 116 is mounted in fixed relation to the standoff members 118 by fixed couplings 120. The battery holder 98 and the battery 100 are mounted to one side of the push plate 116. The standoff members 118 are preferably provided by L-shaped arms 186. The L-shaped arms 186 have an upper surface 188 which includes an upwardly facing, arcuately shaped section 190, and a planer section 192. The planer section 192 is provided by a plate which extends downward from an underside of the L-shaped arm 186 (as viewed in FIGS. 7 and 8), opposite the upper surface 188. The lower end of the planar section 192 defines a standoff foot 194 and has a side profile 228 which is preferably shaped to be the same as a side profile 174 of one of the wheels 94, but larger to extend forward, rearward and beneath of the side profile of the wheel 94 when the standoff member 118 is moved to an extended position, as shown in FIGS. 11-13, discussed below. A hole 196 extends through a central portion of the planar section 192 for passing the drive shaft 168 and wheel bearings 170, with clearance through the planar section 192 as it is rotated about the axis 122-122.

The entire assembly of the standoff members 118 and the push plate 116 are secured to the cart housing 90 by the threaded fasteners 182, which are threadingly secured to the drive assembly support 162. The standoff members 118 and the push plate 116 will rotate about the axis 122-122 which extends through the central longitudinal axes of the threaded fasteners 182. The bias spring 198 in the socket 200 formed into the top of the drive assembly support 162 will push upwards to urge the standoff members 118 and the push plate 116 to rotate in a clockwise direction as viewed in FIG. 8. Preferably, the line guide 60 of the deployment arm 22 mounted to the aerial drone 14 will press against the push plate 116 while the deployment line cable 18 pulls on the scanner cart housing 90 to pivot the push plate 116 and the standoff members 118 in a counter-clockwise direction as viewed in FIG. 8, when the deployment line 18 is spooled onto the winch 24. Rotating the L-shaped arm 186 of the standoff member 118 in the counter-clockwise direction, as viewed in FIG. 8, will cause the standoff feet 194 of the L-shaped arms 186 to extend beneath the wheels 94, breaking magnetic contact between the wheels 94 and the surface of the EUT 26 being scanned.

The counter force assembly 106 is coupled to the cart housing 90 by pivot pins 184 which are preferably provided by a threaded fastener which secures in the mounting hole 178 in the drive assembly support 162, which itself is secured directly to the housing 90. The counter force assembly 106 will rotate about an axis 112-112 which extends through the central longitudinal axes of the two pivot pins 184. The counter force assembly 106 includes two linkages 212, a bar 214 which extends between corresponding ends of the two linkages 212, and a roller 216. A pin 220 is mounted to the mounting bracket 222 which is secured in the recess 138 in the cart housing 90. Two bias springs 218 are mounted to pin 220 of the mounting bracket 222. The two bias springs are preferably provided by torsion springs which have end arms connecting between the mounting bracket 222 and the bar 214 to urge the roller 216 and the bar 214 into a downward position, or a position extending toward the surface of the EUT 26. The counter force assembly 106 is mounted to the cart housing 90 on a side which is opposite that to which the probe assembly 102 is mounted, for purposes of counter-balancing the weight of the probe assembly 102 and to press the probe assembly 102 into the surface of the EUT 26 which is under test.

When placing the scanner cart 88 on the surface of the EUT 26 and during retrieval of the scanner cart 88 from the surface of the EUT, the counter force assembly 106 pressing downward can interfere with placement of the cart 88. The lift mechanism 108 is provided to overcome these difficulties by actuating to rotate the counter force assembly 106 in a counter-clockwise direction as viewed in FIGS. 7 and 9, which lifts the bar 214 and roller 216 off the surface of the EUT 26. The lift mechanism 108 is provided by two linkages 204, each having a link 206 and a link 208 secured together by a pivot pin 224. The opposite ends of the links 208 from the ends secured to the links 206 are secured to intermediate portions of the links 212 by pivot pins 210, such that movement of the links 208 upward will lift the bar 214 and the roller 216 of the counter force assembly 106. Intermediate portions of the links 206 are secured to the enclosure cover 142 by the pivot pins 148 and 150, which provide stationary pivot points secured in fixed relation to the cover 142 and the cart housing 90. Followers 202 are mounted to the terminal ends of the links 206, which are opposite the ends of the links 206 which are secured to the links 208. The followers 202 are preferably provided by wheels or rollers which are pivotally mounted to the terminals ends of the links 206. The linkages 204 are mounted to the cart housing 90 such that the followers 202 are disposed above the arcuately shaped sections 190 of the upper surfaces 188 of the L-shaped arms 186 of the standoff members 118. When the push plate 116 is pushed downward, the bottom of the push plate 116 will engage the followers 202 causing the links 206 to rotate counter-clockwise about the axis 110-110, as viewed in FIGS. 7 and 8, lifting the links 208 upward and rotating the link 212 counter-clockwise, as viewed in FIGS. 7 and 8, and lifting the counter force assembly 106 away from the surface of the EUT 26.

Figure 9:
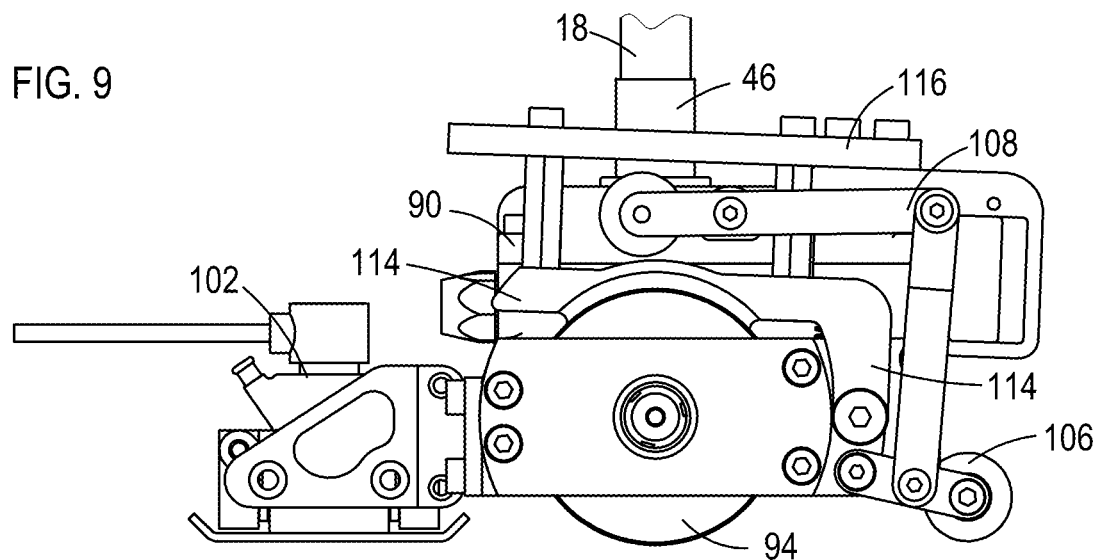
Figure 10:
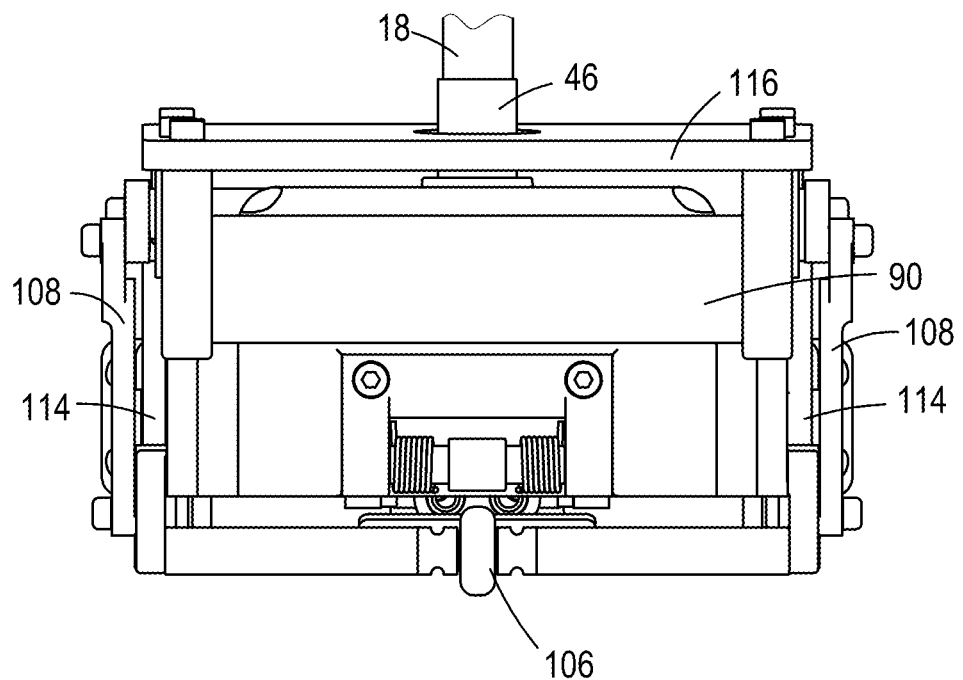

FIG. 9 is a side elevation view and FIG. 10 is an end view of the NDE scanner 16 shown in a deployed position, with the wheels 94 of the scanner cart 88, the counter force assembly 106 and the probe assembly 102 engaging against the surface of the EUT 26 being scanned.

FIG. 11 is a side elevation view and FIG. 12 is an end view of the NDE scanner 16 shown in a retrieval ready position, with the standoff member 118 deployed to lift wheels 94 of the scanner cart 88 and the counter force assembly 106 raised from engaging the surface of the EUT 26. The wheel 94 has a periphery which includes a circumference 172 and a side profile 174. As noted above in reference to FIG. 8, the standoff foot 194 of the arm 186 of the standoff member 118 has a side profile 228 which is preferably shaped to be of similar shape, or the same shape of the wheel 94, with the profile 228 being larger to extend forward, rearward and beneath of the circumference 172 of the wheel 94 when the standoff member 118 is moved to the extended position as shown in FIGS. 11-13. The standoff member 118 extends around and beyond the periphery of the wheel 94, by extending for a larger size than the circumference 172 of the wheel 94.

Figure 14:
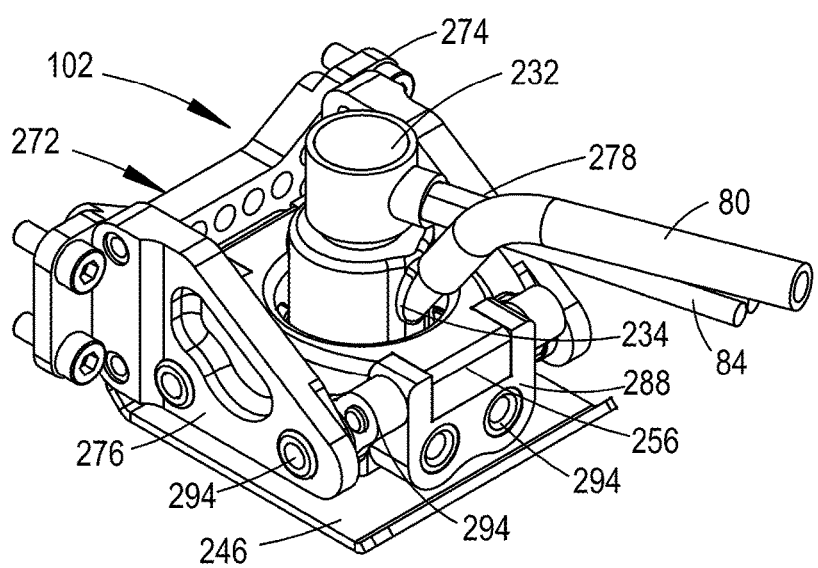
Figure 15:
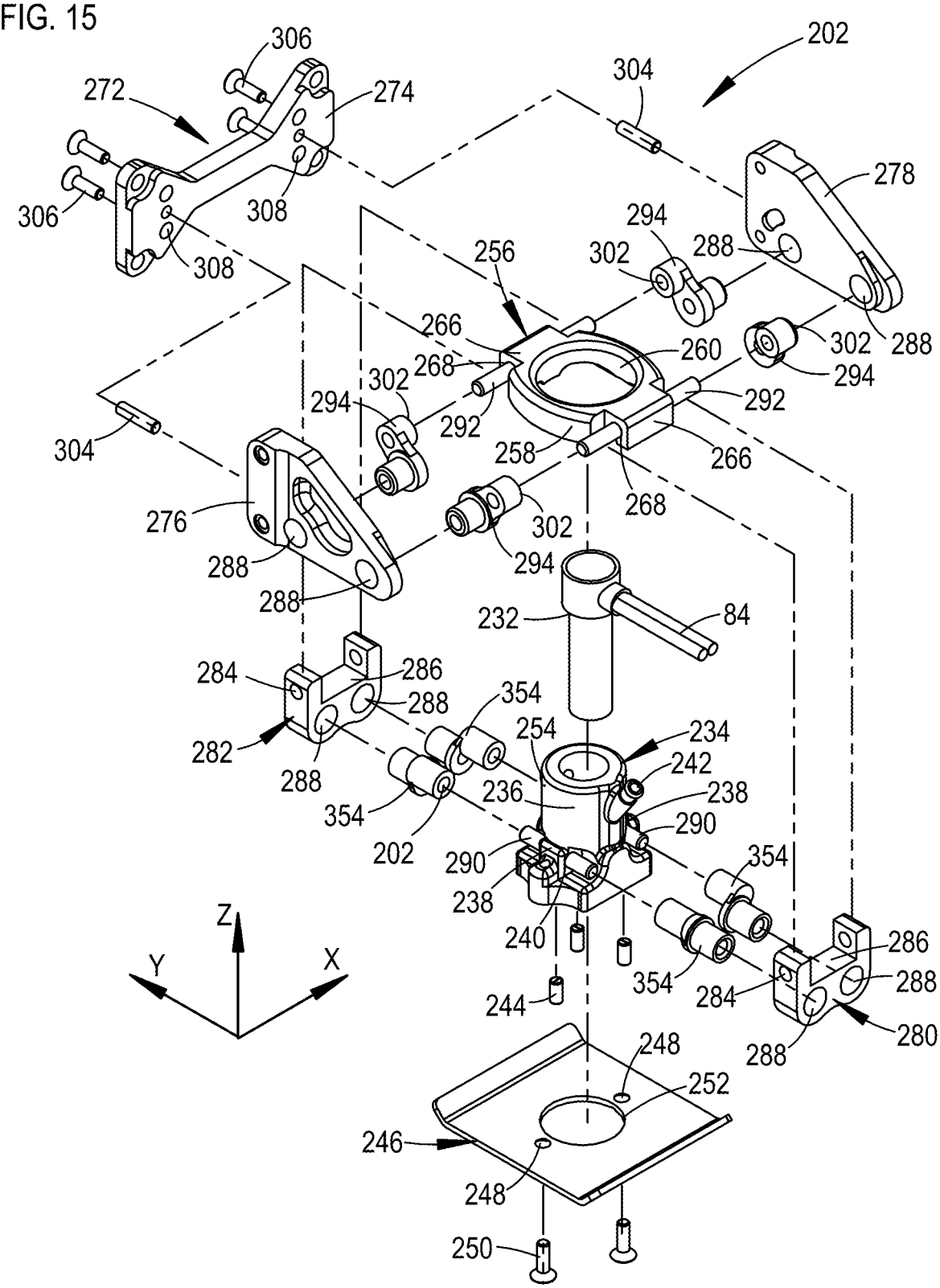

FIG. 13 is an enlarged portion of the end view of the NDE scanner 16 of FIG. 12, showing the standoff member 118 after being deployed, such that the standoff foot 194 is extending beneath the wheel 94, as shown in FIGS. 12 and 13, beyond the circumference of the wheel, lifting the magnetic wheel 94 to separate from the surface of the EUT 26 by a standoff 226. The standoff 226 provides separation distance between the magnetic wheel 94 and the iron in the surface of the EUT 26 to substantially reduce the magnetic force of attraction there-between, requiring less force from the aerial drone 14 to remove the scanner cart 88 from the EUT 26. The side profile 228 of the standoff foot 194 extends beneath the side profile 172 of the wheel 94, that is, beyond the circumference 174 of the wheel, by a distance of the standoff 226, FIG. 14 is a perspective view and FIG. 15 is an exploded view of the probe assembly 102 used for the NDE scanner 16. Coordinate axes are shown in FIG. 15, defining an X-axis, a Y-axis and a Z-axis which as used herein are defined relative to the scanner cart 88. The scanner cart will move in a direction parallel to the Y-axis when moving in a forward direction. The probe assembly 102 has the sensor probe 232 which is secured within a first mounting member 234. The first mounting member 234 is preferably in the general form of a sleeve having a body 236 which is generally cylindrical. Two mounting bosses 238 are provided on opposite sides of the body 236, each having pin ports 240 for receiving the longitudinal pins 290. A coupling fluid tube connector 242, shown in FIG. 15, extends from one side of the first mounting member 234 for connecting to the fluid tube 80, shown in FIG. 14. Three permanent magnets 244 are located in the inward side of the mounting member 234 for assisting in pulling the sensor probe 232 in close proximity to the surface of the EUT 26. A shoe 246 is secured to the inward end of the mounting member 234 by two threaded fasteners 250 which extend through two holes 248 in the shoe 246. An aperture 252 extends through a central portion of the shoe 246 for passing a lower end of the scanner probe 232. A set screw 254 is provided for securing the scanner probe 232 to the body 236 of the first mounting member 234. A second mounting member 256 preferably is provided by a ring having an annular-shaped body 258. A central aperture 260 extends through the center of the body 122 for loosely fitting around the first mounting member 234. Two mounting bosses 266 extend from opposite sides of the second mounting member 256 and have mounting pin ports 268 extending there-through for receiving two transverse pins 292.

A yoke 272 is provided by a back plate 274, a first arm 276 and a second arm 278. The first arm 276 and the second arm 278 extend in parallel, orthogonal to the back plate 274. A first bracket 280 and a second bracket 282 extend in parallel, and parallel to the back plate 274. Pin ports 284 extend through the first and second brackets 280 and 282, adjacent to respective channels 286 formed into the first and second brackets 280 and 282. Two longitudinal pins 290 extend in parallel, through respective ones of the pin ports 240 in mounting bosses 238. Two transverse pins 292 extend in parallel through respective ones of the pin ports 268 and 284, the mounting bosses 266 of the second mounting member 256, and the first and second brackets 280 and 282.

Four sets of two offset pins 294 and 354 are provided for securing the first and second mounting members 234 and 256 to the yoke 272. Mounting pins 304 and threaded fasteners 306 are provided to secure the first arm 276 and the second arm 278 to the back plate 274.

Two sets of the offset pins 294 have first sections 296 which include apertures 302 which are configured for rotatably receiving respective terminal ends of the transverse pins 292, and second sections 298 which are rotatably received in the offset pin ports 288 of the first arm 276 and the second arm 278 of the yoke 272. The yoke 272 and the offset pins 294 are configured to secure the second mounting member 256 to the yoke 272, constrained to rotate about the X-axis. The second mounting member 256 is preferable annular-shaped. Two pairs of the offset pins 354 have first sections 356 which are configured for rotatably receiving respective terminal ends of the longitudinal pins 290, and second sections 358 which are rotatably received in the offset pin ports 288 of respective ones of the first and second mounting members 280 and 282. The second mounting member 256 and the mounting brackets 280 and 282 are configured to secure the first mounting member 234 to the second mounting member 256, constrained to rotate about the Y-axis.

This configuration provides a double gimbal arrangement with the mated pairs of the offset pins 294 restricting movement of the shoe 146 and the sensor probe 232 in around the X-axis, and the mated pairs of the offset pins 354 restricting movement of the shoe 146 and the sensor probe 232 in around the Y-axis. The restricted movement of the sensor probe 232 and the shoe 246 along the X axis and the Y axis provides substantially parallel orientation of the terminal end of the sensor probe 232 and the shoe 246 to the surface of the EUT 26.

Figure 16:
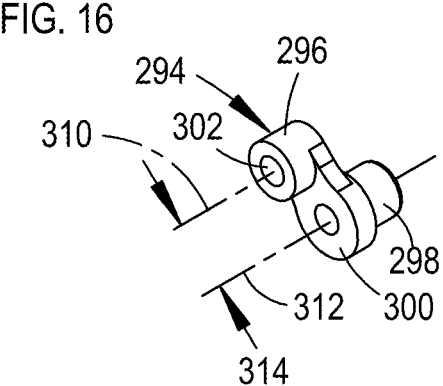

FIG. 16 is a perspective view of the offset pin 294, which is preferably L-shaped when viewed from a side elevation view. The offset pin 294 each has a first section 296, a second section 298 and an offset section 300 extending between the first section 296 and the second section 298. The first section 296 preferably has an aperture 302 which extends for rotatably receiving one of the transverse pins 292, which defines an axis of rotation 310. The second sections 296 preferably have bearing surfaces which are rotatably received within an aperture defining an offset pin port 288 in the yoke 272 (or the second mounting member 256) from which the respective offset pin 294 is suspended, defining an axis of rotation 312. The distances between the axis 310 and 312 define a offset length 314.

Figure 17:
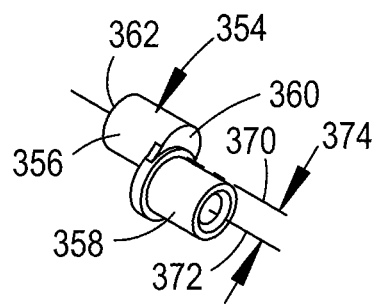

FIG. 17 is a perspective view of the offset pin 354, which is similar in shape to the offset pin 294 when viewed from a side elevation view, but in this particular embodiment the offset pin 354 has a shorter overall length than the offset pin 294. The offset pin 354 has a first section 356, a second section 358 and an offset section 360 extending between the first section 356 and the second section 358. The first section 356 preferably has an aperture 362 which extends for rotatably receiving one of the longitudinal pins 290, which defines an axis of rotation 370. The second section 358 preferably has a bearing surface which is rotatably received within one of the offset pin ports 288, which are located in one of the first bracket 280 and the second bracket 282. Rotation of the second section in a respective pin port will define an axis of rotation 372. The distance between the axes 370 and 372 defines an offset length 374.

Figure 18:
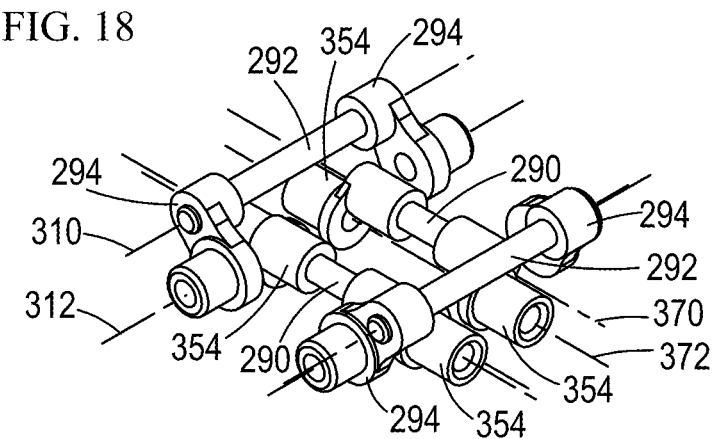

FIG. 18 is a perspective view showing the configuration in which the first offset pins 294 and the second offset pins 354 are mounted together to provide a dual gimbal configuration for constrained movement about two axes, the X-axis and the Y-axis. The mated pairs of offset pins 294 and 354 are preferably configured in an alignment such that the ends of the offset pins 294 and 354 closest to the surface of the EUT 26 are closer together than the ends which are located further from the EUT surface. That is, for the offset pins 294 the second sections 298 and the axes 312 are spaced closer together than the first sections 296 and the axes 310. For the offset pins 354 the second sections 358 and the axes 362 are spaced closer together than the first sections 356 and the axes 370. When the NDE scanner 16 is operated on a horizontal surface of the EUT 26, the lower ends of the respective two pairs of offset pins 294 are located closer together than the upper ends of the offset pins 294, and the lower ends of the two pairs of offset pins 354 are located closer together than the upper ends of the offset pins 354. Referring to one set of the offset pins 294, projection lines 316 (shown in FIG. 19) extend through the axes of rotation 310 and 312 for the mated two of the offset pins 294 and will intersect to define a central axis of rotation 318 about either the Y-axis or the X-axis, depending upon the orientation of the particular offset pins 294. The shoe 246 will rotate about the central axis of rotation 318 when a disturbance is encountered by the shoe 246 moving along the surface of the EUT 26

Figure 19:
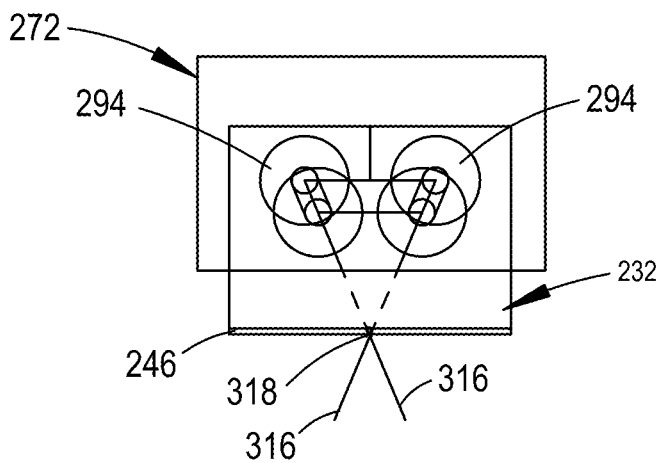

FIG. 19 is a side elevation view of the second mounting member 256, the probe 232, and the two offset pins 294 which are connected there-between and working as a mated pair. The following discussion is applicable to the mated pairs of the offset pins 354, but parameters for only one pair of the offset pins 294 are discussed below. The mated pair of the offset pins 294 extending between the yoke 272 and the second mounting member 256 will perform in similar manner as described in the following, except that the lengths 346 may be selected to be of a different length than that of the offset pins 294 connecting between the second mounting member 256 and the probe 232. The offset pins 294 shown in FIG. 19 will rotate about the X-axis, and will constrain rotation of the probe 232 relative to the second mounting member 256. As noted above, the pivotal connections for the mated pairs of the offset pins 294 located closest to the shoe 246 are spaced closer together than the pivotal connections for the offset pins 294 located further away from the shoe 246, and the surface of the EUT 26. The offset length 314 and the spacing between the axes 312 relative to the axes 310 of the mated pair of the offset pins 294 will determine the center of rotation 318 for the probe 232 about the X-axis and the accuracy about which the assembly rotates around the focal point or center of rotation 318.

The yoke 272, the second mounting member 256, and the first mounting member 234 to which the probe 232 is fixed, are connected together in a double gimbal arrangement by two sets of pairs of the offset pins 294, with the lengths and spacing for mated pairs of the offset pins 294 constraining rotation of connected members about the X-axis and the Y-axis, respectively. The constraint to movement of the shoe 246 provided by this configuration assists in maintaining the sensor probe 232 in flat, intimate contact with a variable surface while being moved over the surface, providing a gantry mechanism. The two rotational axes 318 of compliance will be degrees of freedom about the two perpendicular lines which are parallel to the X- and Y-axes, and should ideally pass through the vertical centerline at the bottom, terminal end of the probe 232, preferably at the bottom of the shoe 242, which is the end closest to the EUT surface being measured for vertical surfaces. These two degrees of freedom will allow the shoe 246 to maintain flat contact with a surface that may vary from being absolutely parallel to the plane of the probe 232. Preferably, the shoe 246 will be held against the surface of the EUT 26, either by gravity or by spring pressure such as that provided by the counter force contact assembly 106.

Figure 20:
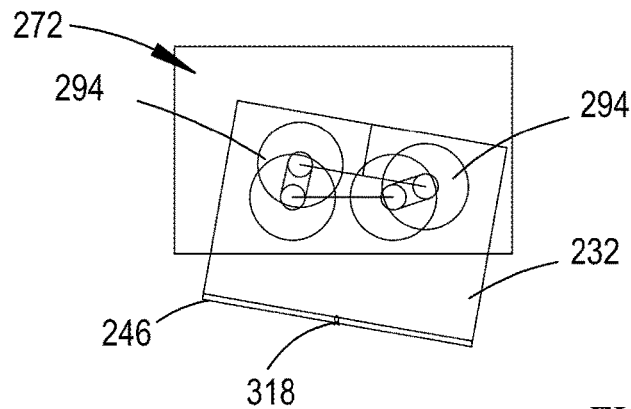
Figure 21:
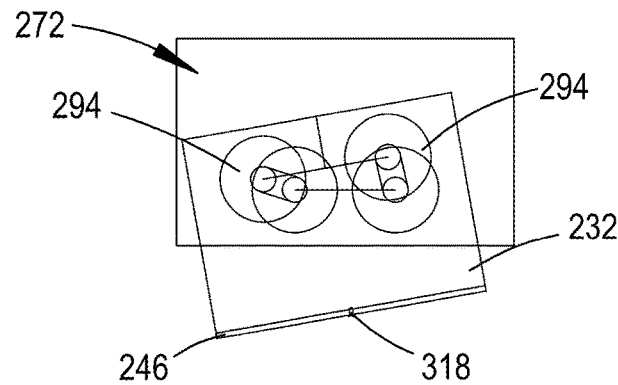
Figure 22:
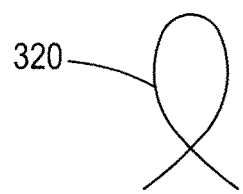

FIGS. 20 and 21 show the shoe 246 rotating as constrained by the mated pair of offset pins 294. The axis 318 about which the end of the shoe 246 nearest to the EUT surface rotates will follow a path 320, shown in FIG. 22. FIG. 22 shows the path 320 that the axis 318 at the end of the shoe 246 closest to the EUT surface follows in rotation constrained by the mated pair of offset pins 294. The path 320 is shown in FIGS. 19, 20 and 21, but is almost imperceptible.

Figure 23:
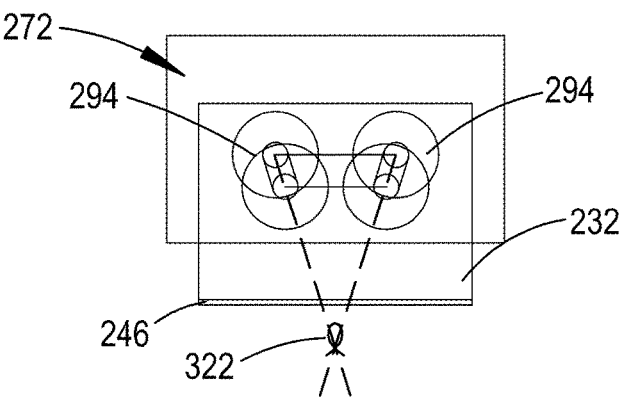

FIG. 22 illustrates a path 320 that the rotational axis 318 of the shoe 246 travels during the movement shown in FIGS. 19, 20 and 21, constrained by the mated pair of offset pins. In FIG. 23 the center of the shoe 246 is spaced apart from the projected vertexes 318 of offset lines 316, further away from the surface of the EUT. With further rotational movements, the path of axis 318 deviates from the pseudo rotational point and moves in the path displayed in FIG. 22. In the arrangement of FIG. 19, the two projection lines 316 passing through the offset dimensions 314 of the offset shafts 294 are configured to converge at the desired point of rotation 318. For very small rotational movements, the shoe 246 rotates substantially about that point 318 with high precision. The mechanics of this arrangement are also substantially conducive to overcoming the tipping moment, and the reaction of the shoe 246 in being pushed away from a point of obstruction or elevated surface protrusion will raise the edge of the shoe 246 at that point. This will assist the shoe 246 in ramping up and over a protrusion. With further rotational movements, the path of the convergence axis 318 deviates from the pseudo rotational point and moves in the path 320 displayed in FIG. 22. As well as providing the desired reluctance to tipping, the error is also reduced over the practical range of the mechanism, which for example for ultrasonic transducer probes, is typically +/−10 degrees. In practice, this is a sufficient range to compensate for differences between a plane defined by the show 246 and a larger plane defined by the center of wheels and the contact point of the show 246. In both FIGS. 20 and 21, the shoe 246 is rotated 8 degrees.

In FIG. 23 the center face of the shoe 246 is configured with projected lines 316 through respective axes 310 and 312 being focused such that the rotation axis 322 of the shoe 246 is located beneath the shoe 246. This configuration may be achieved by lengthening the offset distance 314 between the axes 310 and 312, or by changing the spacings between respective ones of ends 296 and 298, or a combination of both. The path 322 will be larger in FIG. 23 than the path 320 shown in FIGS. 19 through 21, with a lower focal point due to the longer lengths of the pin offsets 314 and the projection lines 316 from that of FIGS. 19 through 21. The modifications to the configuration of the offset pin 294 results in the convergence of the projection lines 316 at a point 322 below the shoe 246, as shown in FIG. 23 at the zero degree rotation point, which results in further restriction of the rotation of the shoe 246 to rotation of less angular displacement than that of the configuration shown in FIGS. 19 through 21.

Figure 24:
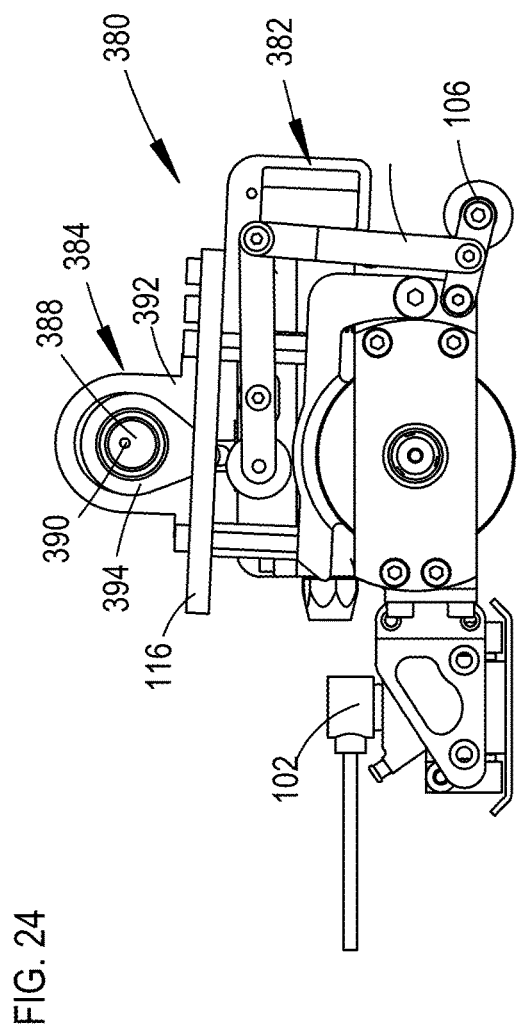

FIG. 24 is a side view of an alternative NDE scanner 380 having actuator 384 mounted to push plate 116, which pull the canner cart 382 toward the push plate 116. The actuator 384 and the push plate 116 are shown in released positions. The actuator 384 includes a closed-loop DC servo motor 386 and cam 388. The cam 388 is mounted to a rotary shaft 390.

The cam 388 is rotatably connected to a link 394, disposed in an aperture in the link 394 with a journal bearing defined there-between. The link is connected to the top of the housing for the scanner cart 382. The actuator 384 is mounted atop the scanner cart 382 by means of a mounting bracket 392, preferably mounted to the plate 116. The wheels 94 and the counter force assembly 106 are shown in released positions.

Figure 25:
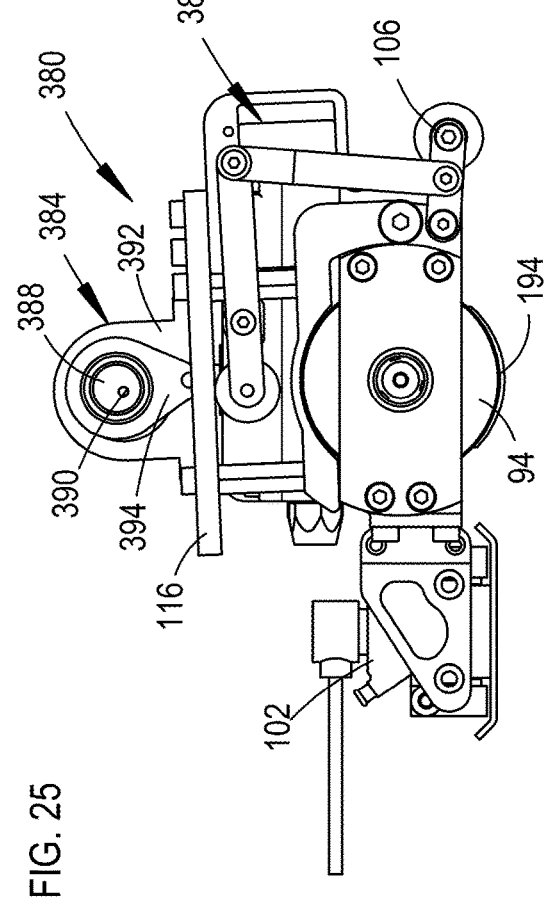

FIG. 25 is a second side view of the alternative NDE scanner 380 showing actuator 384 having operated to power the motor 386 to move the cam 388 into a position in which the scanner cart 382 is pulled toward the push plate 116, moving the standoff foot 194 into an extended position and lifting the counter force assembly 106.

Figure 26:
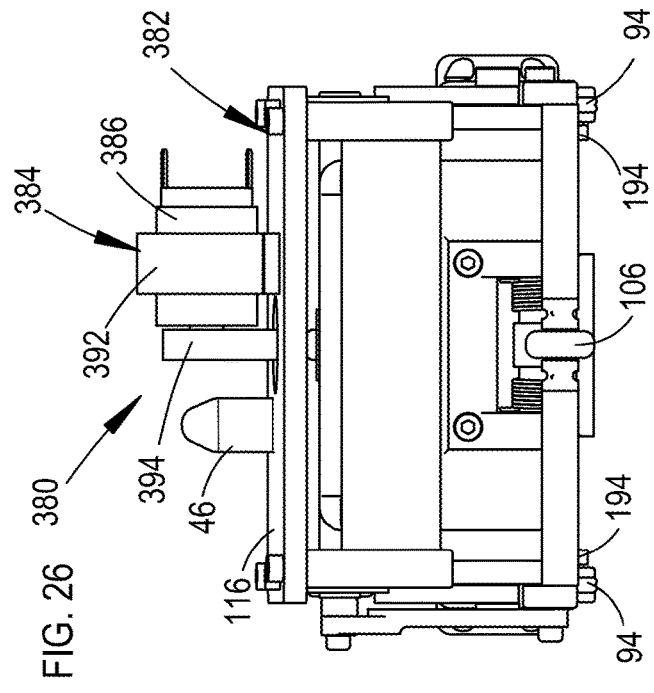

FIG. 26 is an end view of the alternative NDE scanner 380 showing the actuator 384 in an intermediate position, with the standoff foot 194 no longer extended to raise the wheel 94 and the counter force assembly 106 remaining in a lifted position. A coupling 46 is mounted to the plate 116 for coupling to a cable connecting to an aerial drone, such as the deployment line cable 18 of FIG. 1. The coupling 46 may also be mounted directly to the housing for the scanner cart 382 with a port for passing through the plate 116, similar to the port 48 shown in FIG. 7. In other embodiments a U-shaped bracket (not shown) may be provided for connecting the scanner cart 382 to a cable connecting to an aerial drone.

Figure 27:
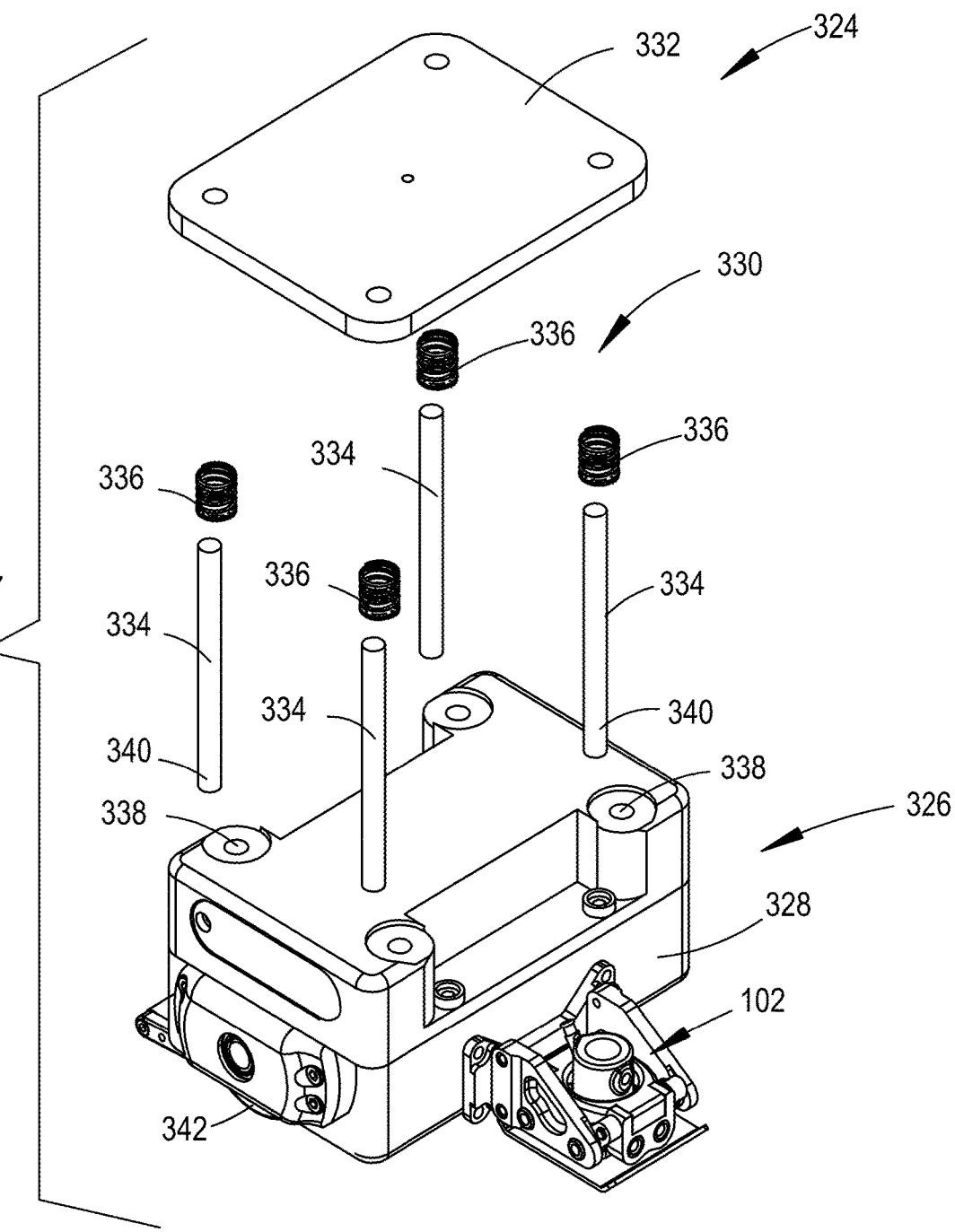

FIG. 27 is a partially exploded view of an alternative embodiment NDE scanner 324 showing features of a stand-off mechanism 330 for selectively mounting the NDE scanner 324 to the EUT 26. The stand-off mechanism 330 includes an engagement member 332, which is preferably provided by a plate. Stand-off members 334 are preferably provided by four pins, but in other embodiments one or more pins may be used. The stand-off members 334 have first terminal ends connected to the engagement member 332. One or more bias springs 336 (four shown) extend between the engagement member 332 and an outward side of the cart housing 328 to urge the engagement member 332 to move away from the cart housing 328. The stand-off members 334 extend through the bores 388 to pass through the cart housing 328. The lengths of the stand-off members 334 are configured such that when the engagement member 332 is pressed downward against the force of the bias springs 336, the inward terminal ends 340 of the stand-off members 334 will extend from the inner side of the cart housing 328 for a distance which is further than a pair of spaced apart magnetic wheels 342 extending there-from. This provides separation from the wheels 342 and the surface of the EUT 26 to significantly reduce the magnetic coupling between the wheels 342 and the EUT 26, allowing the aerial drone 14 to more easily retrieve the NDE scanner 324 from the EUT 26. The stand-off mechanism 330 is extended to assist in deployment of the NDE scanner 324 by preventing magnetic coupling between the wheels 342 and the EUT 26 until the aerial drone 14 has placed the NDE scanner 324 in a selected position relative to the EUT 26.

Figure 28:
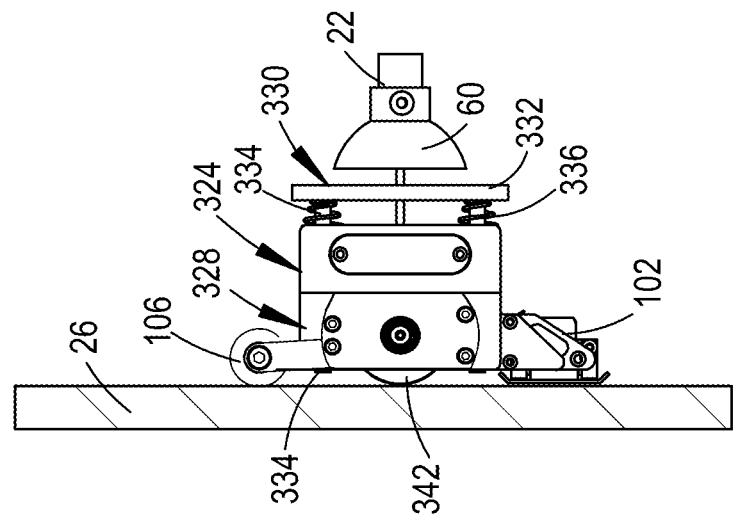
Figure 29:
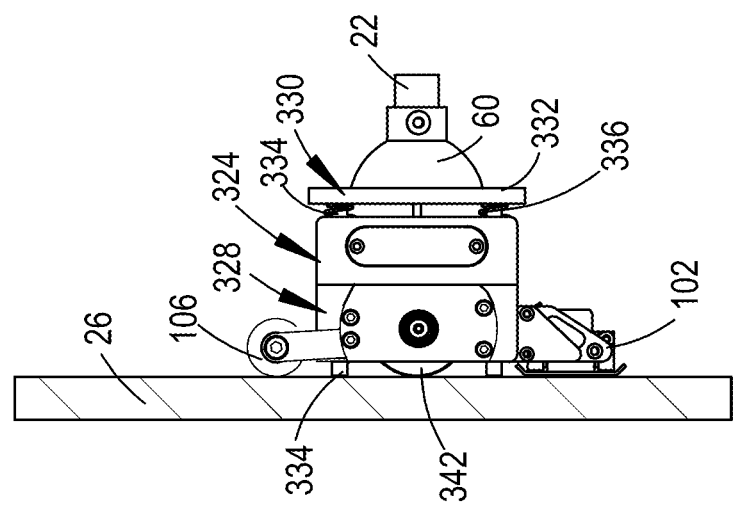
Figure 30:
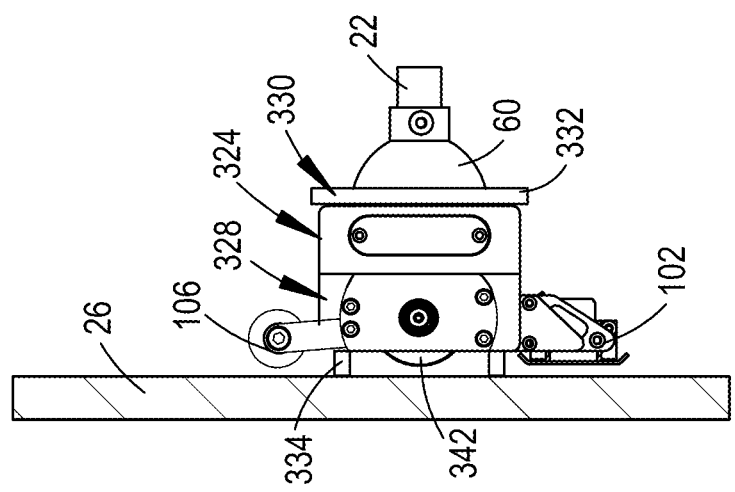

FIGS. 28 through 30 are side-elevation views of the alternative embodiment NDE scanner 324 during deployment and retrieval using the aerial drone 14. FIG. 28 shows the alternative stand-off mechanism 330 in an extended position to lift wheels 342 of the NDE scanner 324 from the EUT 26. FIG. 29 is a side-elevation view of the alternative embodiment to the NDE scanner 324 during deployment and retrieval, showing the stand-off mechanism 330 in an intermediate position with both the alternative stand-off mechanism 330 and the wheels 342 of the NDE scanner 324 contacting the surface of the EUT 26. FIG. 30 is a side-elevation view of the alternative embodiment to the NDE scanner 324 during deployment and retrieval, showing the alternative stand-off mechanism 330 in a retracted position with the wheels 342 of the NDE scanner 324 fully engaging the EUT 26 and the stand-off mechanism 330 fully retracted into the cart housing 338 of the NDE scanner 324.

Figure 31:
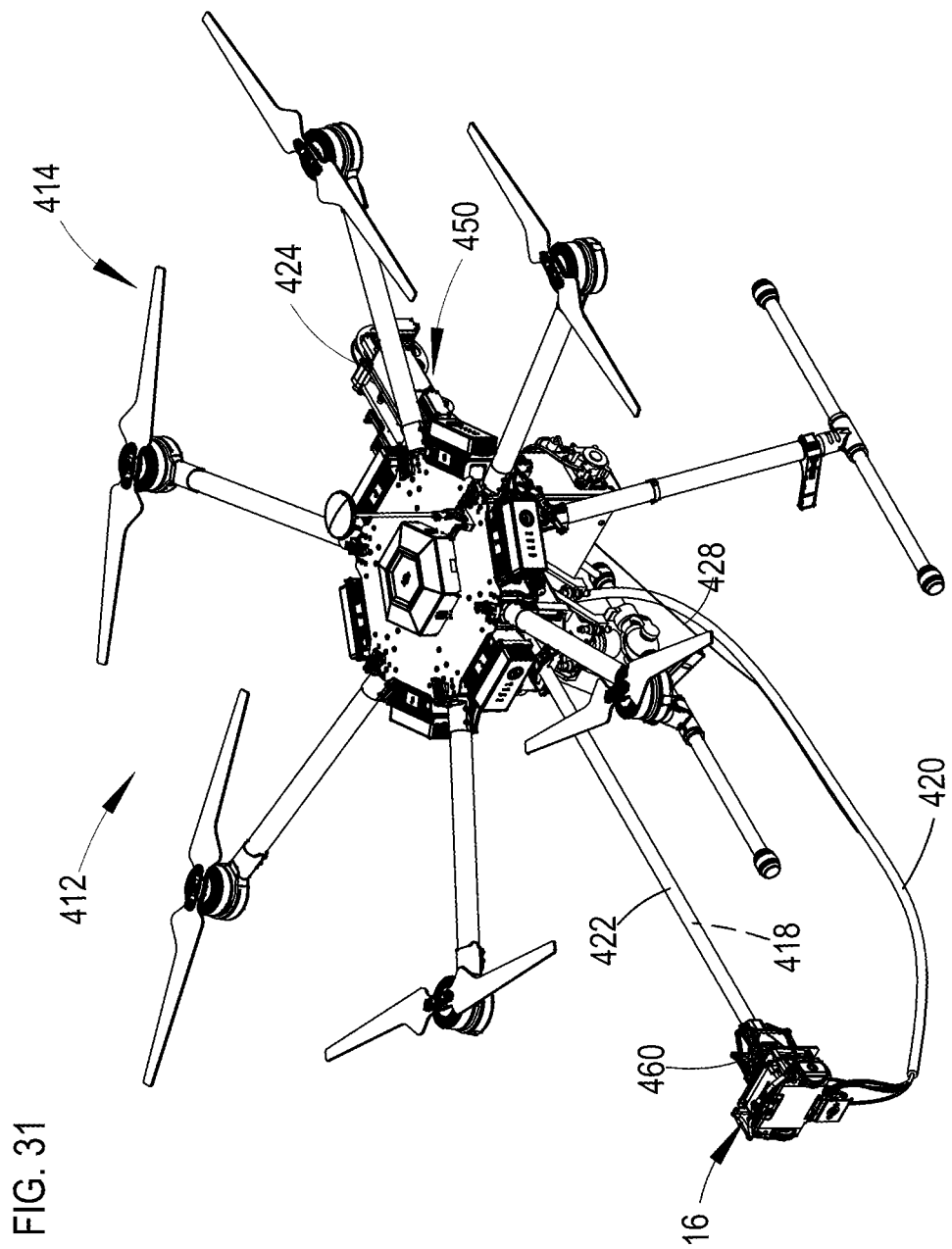

FIG. 31 is a perspective view of a second aerial drone deployed test unit 412, showing the NDE scanner 16 prior to deployment from an aerial drone 414 to scan an EUT, such as the EUT 26 shown in FIG. 1. The test unit 412 includes both the commercially available aerial drone 414 and the NDE scanner 16. The aerial drone 414 has been modified for use by mounting a second test unit attachment 450 thereto. The test unit attachment 450 is connected to the NDE scanner 16 by a deployment tether 418 and the umbilical connector 420. A deployment arm 422 extends forward from the test unit attachment 450, with a terminal end which is spaced apart from the aerial drone 414. The deployment tether 418 is preferably a flexible member which is selectively dispensed from and spooled onto a winch 424 mounted to test unit attachment 450 affixed to the aerial drone 414. The deployment tether 418 is spooled from the winch 424 after the NDE scanner 16 is positioned on the EUT 26, allowing the aerial drone 414 and the NDE scanner 16 to move independently of one another. The NDE scanner 16 is retrieved by the aerial drone 414 approaching the NDE scanner 16 as the deployment tether 418 is spooled onto the winch 424. In some embodiments a second winch may be added for spooling the umbilical connector 420. In the present embodiment for the second test unit 412, a second winch is not used, but instead the umbilical connector 420 will remain slack during use and an umbilical tether 428 is provided which is spooled onto a second spool mounted adjacent to a primary spool, discussed below.

Figure 32:
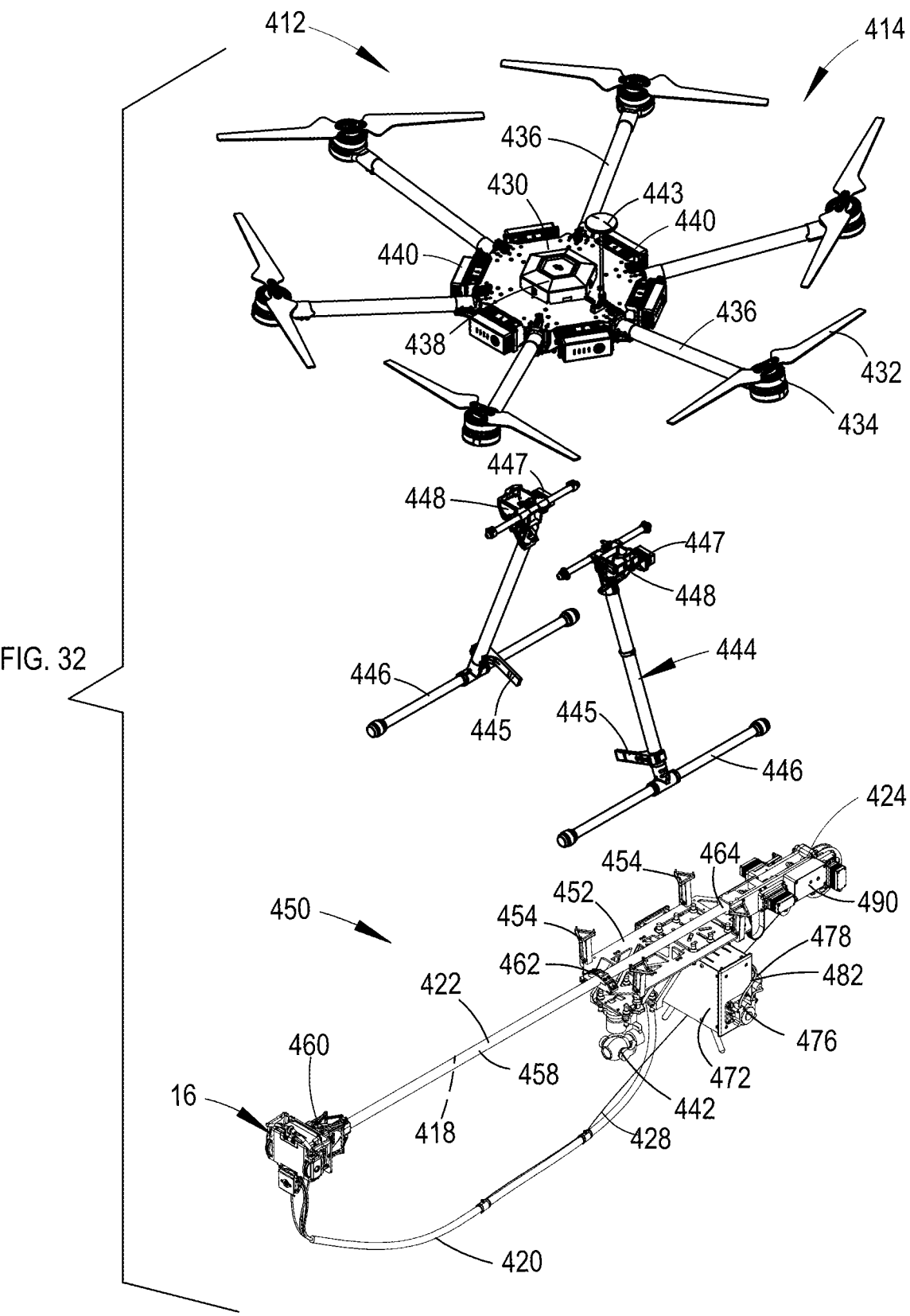

FIG. 32 is an exploded, perspective view of the second aerial drone 414 and the test unit attachment 450 which is mounted to the drone 414. The aerial drone 414 is preferably a commercially available drone, such as a Matrix 600 Series drone available from SZ DJI Technology Co., Ltd. of Shenzhen, China. The aerial drone 414 has a frame 430 from which extend frame arms 436 with motors 434 mounted to respective ones of the frame arms 436. Rotors 432 are coupled to the motors 434. A flight control section 438 is mounted to a central portion of the drone frame 430 and provides control electronics for the drone 414. Batteries 440 are mounted to the drone frame 430. Landing gear 444 are rotatably mounted to the underside of the drone frame 430 and are retractable to lifted positions by means of a retraction module 448 powered by two servo motors 447. The landing gear 444 also includes skids 446. A GPS antenna 443 is mounted to extend upward from the drone frame 430. The test unit attachment 450 has a frame 452 which is mounted to the drone frame 430 by mounting brackets 454. A vision system camera 442 is suspended from an underside of the frame 452 and mounted in a gimbaled arrangement. Aerial drone antennae 445 are mounted to the legs of the landing gear 444. The drone antennae 445 are preferably provided by drone manufacturer and provide data communication with the ground for the onboard drone flight controller, transmitting GPS location, and vision system information for positioning the camera 442 and transmitting images to the ground. The winch 424 is mounted to the rearward end of the frame 452. An extension tube 458 is mounted to an upper side of the frame 452 and extends from the forward end of the winch 424 to a spaced apart position forward of the frame 452 and the aerial drone 414. The extension tube 458 is secured to the frame 452 on a forward end by a clamp 462 having two parts which are secured together with threaded fasteners. The rearward end of the extension tube 458 is secured to the frame 452 and the winch 424 by extending into an aperture 464 in the forward end of the winch 424. A scanner dock 460 is mounted to a forward end of the extension tube 458 and is configured to provide compliance when engaging with the scanner 16.

Figure 33:
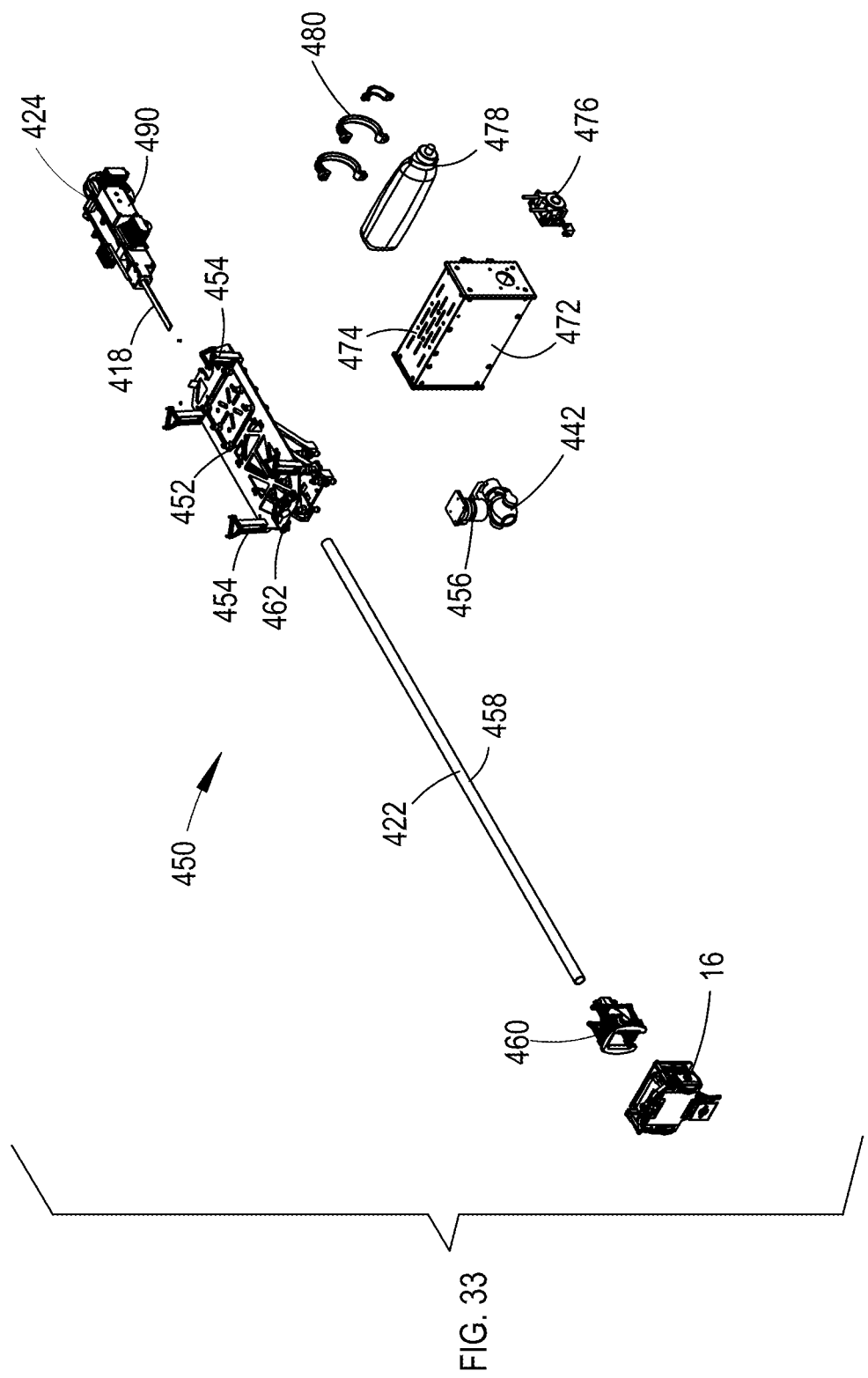

FIG. 33 is an exploded perspective of the second test unit attachment 450. The frame 452 has the upwardly extending mounting brackets 454 for securing to the drone frame 430 (shown in FIG. 32). The vision system camera 442 is shown with the gimbaled mounting bracket 456 which secures to the underside of the frame 452. The winch 424 is located at the rearward end of the frame 452 and the extension tube 458 is shown forward of the frame 452. The scanner dock 460 is shown forward of the extension tube 458 and the scanner 16 is shown forward of the scanner dock 460. A control panel 472 is mounted on one side of the frame 452 for housing control, telemetry, ultrasonic instrumentation, and communication electronics for the scanner 16. Data storage and wireless transmission to the ground for the NDE scanner is also housed in the control panel 472. The control panel 472 may be wirelessly coupled to the NDE scanner 16 by means of radio signals, by means of conventional data signal lines extending through the umbilical 420, or a combination of both. Antennae 470 mounted to the underside of the control panel 472 are preferably provided for data communication between the control panel 472 and the ground, and in some embodiments with the NDE scanner 16. Vents 474 are provided on the control panel 472 for cooling. A couplant pump 476 and a couplant reservoir 478 are mounted to the control panel 472. Mounting brackets 480 secure the couplant reservoir 478 to the control panel 472. Couplant fluid is supplied to the NDE scanner 16 by the pump 476 and the reservoir 478 to provide acoustic coupling between an acoustic transducer mounted to the scanner 16 and an EUT. In other embodiments a dry coupling method such as a wheel probe or EMAT transducer may be utilized.

Figure 35:
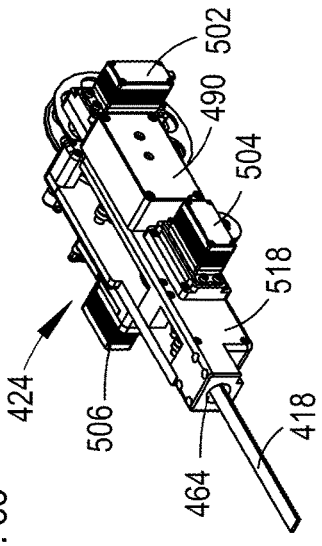
Figure 34:
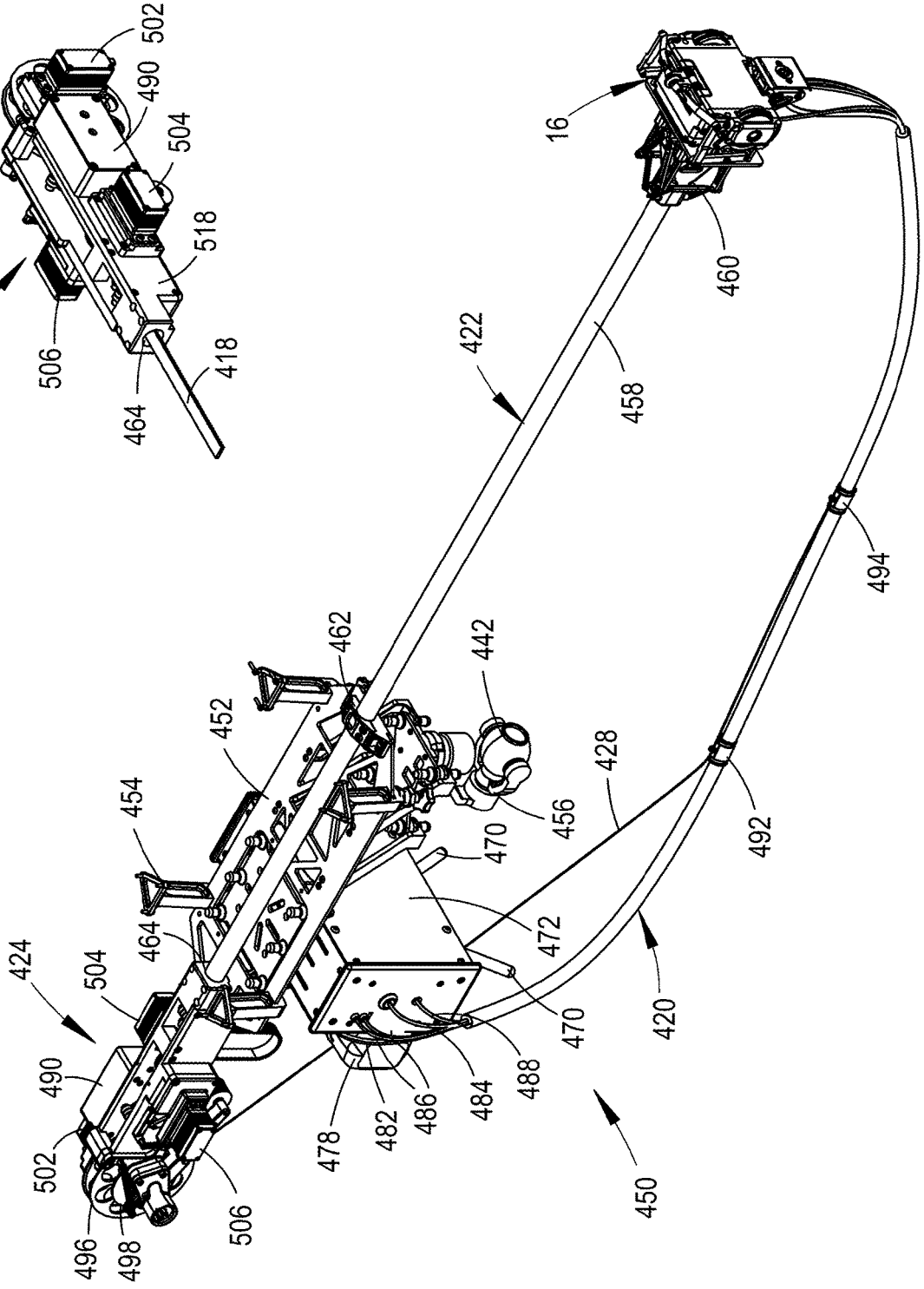

FIG. 34 is a perspective view of a left side of the second test unit attachment 450 and FIG. 35 is a perspective view of the right side of the second winch 424. The sonic couplant fluid passes from the reservoir 478, through the couplant pump 476 and through a couplant tubing 482, which passes through the umbilical 420 to the probe assembly 102 of the scanner 16 shown in FIG. 5. A scanner power cable 484, a scanner data cable 486 and a control signal cable 488 pass from the control panel 472, through the umbilical 420 and to the scanner 16. Optionally, wireless communication modules may also be used for communicating between the NDE scanner 16 and the control panel 472, or directly between the NDE scanner 16 and a remote computer located with a user operating the test unit 412. Preferably the data and power cables 484-488 pass through the umbilical 420 and the operator on the ground communicates with the control panel 472 through use of a wireless communication module located in the control panel 472 and one or more antennae 470 mounted to the test unit 412. Power for operating the scanner cart 88 is preferably provided by the power cable 484. In other embodiments, power for operating the scanner cart 88 may be provided by the battery 100 (shown in FIGS. 4-6), which is optional.

The umbilical tether 428 is shown extending from the winch 424 to the coupling clamps 492 and 494 which are spaced apart and fixed in a location proximate to a midpoint of the umbilical 420. The umbilical tether 428 is used for determining the combined center of gravity for the aerial drone 414 and the test unit attachment 450, offsetting the weight of the NDE scanner 16 when the NDE Scanner is attached to the scanner dock 460. A terminal end of the umbilical tether 428 is secured for selectively spooling from and onto a reel 498 mounted adjacent to a spooling reel 496 for the scanner deployment tether 418. After the NDE scanner 16 is released from the scanner dock 460, both the deployment tether 418 and the umbilical tether 428 are spooled from the reels 496 and 498, respectively, with the weight of the extending umbilical 420 moving the combined center of gravity for the aerial drone 414 and the attachment 450 forward. During retrieval of the NDE scanner 16, both the deployment tether 418 and the umbilical tether 428 are wound onto the reels 496 and 498, respectively. Retrieval of the umbilical tether 428 gathers intermediate and outward end portions of the umbilical 420 toward positions which are closer to being located beneath the aerial drone 414, and thus moving the combined center of gravity for the aerial drone 414 and the attachment 450 rearward, to counterbalance the weight of the NDE scanner 16 when secured against the scanner dock 460.

FIGS. 34 and 35 show three servo motors 502, 504 and 506 used for driving the winch 424. The reel motor 502 powers the reels 496 and 498, which are preferably mounted to a single shaft and move together. The winch drive motor 504 provides a primary driver for dispensing and retrieving the deployed tether 418 from and into the winch 424. The brake motor 506 is selectively operated to maintain the deployment tether 418 in a fixed position relative to the winch 424. A control panel 490 is provided in addition to the control panel 472. The control panel 490 houses circuitry used in controlling the reel motor 502.

FIG. 36 is a side elevation view of the left side of the second winch 424 with housing covers 510 enclosing various drive pulleys and rollers, and FIG. 37 is a side elevation view and FIG. 38 is a perspective view of the left side of the second winch 424 after removing winch housing covers 510. The deployment tether 418 is preferably a toothed or cogged flexible drive belt having free terminal ends, as opposed to drive belts formed into a continuous loop. A cogged drive belt is preferably used to prevent slip between the tether 418 and a drive pulley 520. An idler pulley 522 and an idler pulley 524 are similarly provided by toothed or cogged pulleys. In other embodiments, a smooth drive belt with free terminal ends may be used for the deployment tether 418, and then the foregoing pulleys may be provided with either grooved rims or smooth rims. The Rollers 528, 530 and 532, and an idler pulley 526 are not cogged, that is, they do not have teeth.

The idler pulley 526 provides a take-up idler mounted to a first end 508 of a take-up arm 512. A feedback position sensor 514 is pivotally mounted between the winch frame 518 and a first section, or central section, 516 of the take-up arm 512 for measuring the angular position of the take-up arm 512 relative to the winch frame 518, which indicates a length 544 of the take-up loop 546 in deployment tether 418. The position sensor 514 is preferably provided by an encoder or a potentiometer which is used to determine the angular displacement of the take-up arm from which a length of the take-up loop is determined. The take-up loop 546 extends between the winch drive pulley 520 and the take-up reel 496 for the deployment tether 418, with the idler pulley 526 located along the take-up loop 546 between the take-up reel 496 and the winch drive pulley 520. A take-up spring 540 acts on a second end, or rearward end, 534 of the take-up arm 512 to push the idler pulley 526 downward on the take-up loop 546 in the deployment tether 418. The angular position of the take-up arm 512 relative to the frame 518 as measured by the position sensor 514 is then used for synchronizing the speed of the reel drive motor 502 and the take-up reel 496 relative to the speed of winch drive motor 504 and the winch drive pulley 520, which determines the length 546 of the take-up loop 546 in the tether 418. Preferably the control panel 490 contains control circuitry and programming which monitors the angular position readings of the take-up arm 512 from position sensor 514 and controls the synchronization between the take-up reel 496 and the drive pulley 520, synchronizing operation of the drive motors 502, 504 and 506. The take-up loop 546 and the take-up arm 512 provide compliance for the tether 418 as it is spooled relative to the reel 496 and passes over the drive pulley 520.

A slack loop 548 is shown in FIGS. 37 and 38, which occurs when the tether 418 is moved in the outward direction 556 by the drive pulley 520 to spool the tether 418 from the tether reel 496. The scanner cart 88 is magnetically coupled to the surface of an EUT as described above, and the tether 418 will be pulled from the slack loop 548 and the wrench 424 in the direction 552 as the aerial drone 414 is moved away from the scanner cart 88 and as required by the scanner cart 88 when traversing the surface of an EUT. This provides compliance in the tether 418 extending between the aerial drone 414 and the scanner cart 88, with the slack loop 548 being dispensed when the distance between the cart 88 and the drone 414 is increased. The slack loop 548 is not shown in FIG. 36 when the tether 418 is moving in an inward direction 554, being retrieved or spooled into the winch 424. The tether 418 will tighten when being retrieved and the slack loop 548 will no longer be present, until the tether 418 is again spooled from the winch 424 and moved in the outward direction 556 and the slack loop 548 will again form FIGS. 37 and 38. The roller disc 528, the roller disc 530, and the three roller pins 532 press against the smooth side of the deployment tether 418 to assure that the cogged or toothed portion of the tether 418 engages against the teeth of the drive pulley 520 and the idler pulleys 522 and 524 in a manner such that slack cannot accumulate around the engaged portion of the pulleys.

FIG. 39 is a perspective view of the deployment tether reel 496, the umbilical reel 498 and the reel motor 502, and FIG. 40 is an exploded view of the reel drive shaft 550, the deployment tether reel 496, and the umbilical tether reel 498. The reels 496 and 498 are preferably mounted to a single drive shaft 550 which is driven by the reel motor 502, which is preferably a servo motor. The umbilical tether reel 498 is mounted directly to the side of the deployment tether reel 496 and has a spacer 500 defining the space on which the umbilical tether 428 is spooled. Preferably the umbilical is not spooled onto a reel, but rather umbilical tether reel 498 has an umbilical tether 428 provided by a light cord, line or cable. When the reels 496 and 498 are rotated to spool the deployment tether 418 and the umbilical tether 428 (shown in FIG. 34) outward from the reels 496 and 498, the umbilical 420 will extend forward to move the combined center of gravity drone 414 and the test unit attachment 450 forward, compensating for the weight of the NDE scanner 416 no longer being applied to the terminal end of the deployment arm 422. When the reels 496 and 498 are rotated to spool the deployment tether 418 and the umbilical tether 428 (shown in FIG. 34) inward and onto the reels 496 and 498, the umbilical 420 will be gathered back toward positions underneath the drone 414 and the attachment 450, which results in the combined center of gravity drone 414 and the test unit attachment 450 being moved rearward and more underneath the drone 414, compensating for the weight of the NDE scanner 416 being applied to the terminal end of the deployment arm 422. This balances the weight of the scanner cart 88. In other embodiments, an umbilical reel and drive motor may be provided such that the umbilical is spooled onto and off of an umbilical reel, along with rotary electrical and fluid connections to allow for spooling of the umbilical.

FIG. 41 is a perspective view of a brake 562 for the second winch 424 and FIG. 42 is an exploded perspective view of the drive shaft 538, drive pulley 520, and mounting disc 580. The brake 562 is shown in FIG. 36 mounted to the frame of the winch 424 and the brake 562 has been removed from the frame of the winch 424 in FIG. 37. The brake 562 has a frame 564. A gear 566 is secured to the mounting disc 580. The gear 566 and a mounting disc or hub 580 are rotatably mounted to the mounting frame 564. A lever arm 568 is pivotally mounted to the frame 564 by a pivot pin 570. The lever arm 568 has an inward portion adjacent to the pivot pin 570 with teeth 572 defining a gear rack section. The lever arm 568 has an intermediate portion with an underside 574 and an outward end 576. A protuberance extend from the frame 564 to define a tab 578. As shown in FIG. 36, a brake spring 542 extends between the outward end 576 of the lever arm 568 and the tab 578 of the frame 564. The brake spring 542 (shown in FIG. 36) is preferably a tension coil spring which applies a bias force to pull the lever arm 568 toward the tab 578, pulling the teeth 572 of the gear rack section into the teeth 596 of the gear 566. The gear teeth 596 preferably extend radially outward from an outer circumferential periphery of the central body of the gear 566. The gear 566 and hub 580 are rotatably mounted to the frame 564 by a bearing 590. The gear 566 has an aperture 592 for receiving and coupling to the drive shaft 538 of the drive motor 504 and drive pulley 520. The drive shaft 538 preferably has a keyed end 599 having a flat for fixedly engaging with the gear 566 for rotating therewith. Mounting holes 594 are provided in the hub 580 for securing the gear 566 directly to the mounting disc 580. The drive pulley 520 also has an aperture 593 for passing the drive shaft 538. The brake motor 506 is mounted to the frame 564 and has a motor shaft 582. A release arm 584 is mounted to the motor shaft 582 and is rotatable relative to the frame 564. A roller 586 is mounted to the outer end of the release arm 584.

The brake motor 506 is selectively operated to rotate the release arm 584 and engage the roller 586 on the underside 574 of the intermediate portion of the lever arm 568, lifting the arm 568 to disengage the teeth 572 of the rack portion from the teeth 596 of the gear 566 which allows the winch drive motor 504 and the drive pulley 520 (shown in FIGS. 37 and 38) to rotate and spool the deployment tether 418 either from or into the winch 424. Once a selected amount of the tether 418 is spooled into the winch 424, brake motor 506 is then selectively operated to rotate the release arm 584 and move the roller 586 such that the lever arm 568 is lowered and the teeth 572 of the rack portion will again engage the teeth 596 of the gear 566 and prevent rotation of the winch drive motor 504 and the drive pulley 520 (shown in FIGS. 37 and 38), locking the tether in fixed relation relative to the drive pulley 520. When the NDE scanner 16 is being retrieved, the deployment tether 418 will be spooled back onto the reel 496, and then the brake 562 will be engaged to lock the teeth 572 of the rack against the teeth 596 of the gear 566, which locks the scanner cart 88 against the dock 460. The brake 562 is preferably only used to hold the scanner cart 88 on the scanner dock 460, after the deployment tether 418 is fully retracted and spooled onto the reel 496.

FIG. 43 is a perspective view and FIG. 44 is an exploded, perspective view of the gimbaled scanner cart dock 460. The scanner cart dock 460 has a platform 602 with a forward end providing deck 604 having a planar surface. The platform 602 preferably has a U-shaped body with four spaced apart, rearward facing mounting tubes 608 and an open section 606 on a lower end, extending between two of the lowermost mounting tubes 608. A connector bar 610 extends between the two lowermost mounting tubes 608. A compliance linkage assembly 616 is mounted between the platform 602 and a dock bracket 628 to provide a gimbal mechanism with compliance for when the platform 602 of the scanner cart dock 460, the scanner cart 88 and the EUT are misaligned during deployment and retrieval of the scanner cart 88. The compliance linkage assembly 616 has two vertically disposed pivot pins 618 with two inward links and two outward links pivotally mounted to each of the pivot pins 618. Rearward ends of a set of one of the inward links 620 and one of the outward links 622 are pivotally mounted to respective ends of the two pivot pins 618, one set on the top of each pivot pin 618 and one set on the bottom of each pivot pin 618. Forward ends of each of the outward links 622 are constrained, secured in fixed relation to respective ones of the four rearward facing mounting tubes 608 of the platform 602 and held in place by pins 624. Forward ends of each of the inward links 620 are pivotally secured to respective ones of the four forwardly disposed upward link mounting tabs 642 and lower link mounting tabs 644 of the dock bracket 628 and are pivotally secured thereto by pins 626.

The dock bracket 628 has a rearward facing tubular section 630 which is secured to the forward end of the tubular deployment arm 422 (shown in FIG. 34). The tubular section 630 has an aperture 632 into which deployment arm 422 extends (shown in FIG. 34) and through which the deployment tether 418 extends (shown in FIG. 35). The forward ends of the dock bracket 628 separate into an upper boss 634 and a lower boss 636. Two spaced apart roller mounting tabs 638 downwardly extend from opposite sides of the upper boss 634. The roller 648 is pivotally mounted between the roller mounting tabs 638 by a roller shaft 639. Two spaced apart cogged roller mounting tabs 640 upwardly extend from opposite sides of the lower boss 636. The cogged roller 646 is pivotally mounted between the cogged roller mounting tabs 640 by a roller shaft 641. As noted above, the forward ends of the inward links 620 are pivotally secured to respective ones of the upward link mounting tabs 642 and the lower link mounting tabs 644. As shown in FIG. 43, bias springs 650 extend between respective spring mounting bosses 652 defined on the rearward tubular end section 630 of the dock bracket 628 and respective end portions of the pivot pins 618. Loops extend from opposite ends of the mounting bosses 652 for mounting first terminal ends of the bias springs 650. Recesses 614 are formed in the end portions of the pivot pins 618, spaced apart for mounting the ends of the springs 650 thereto. On the left side of the compliance linkage 616 and the dock bracket 628, two bias springs 650 extend from respective end sections of each of the pivot pins 618 to the left side of the upper and lower mounting bosses 652. Similarly, on the right side of the compliance linkage 616 and the dock bracket 628, two bias springs 650 extend from respective end sections of each of the pivot pins 618 to the right sides of the upper and lower mounting bosses 652. The bias springs 650 are preferably provided by coil springs formed of spring steel.

Figure 46:
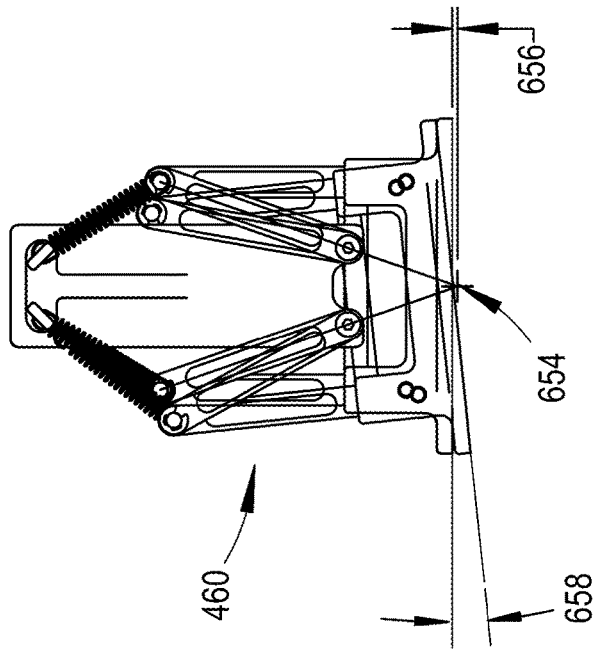
Figure 45:
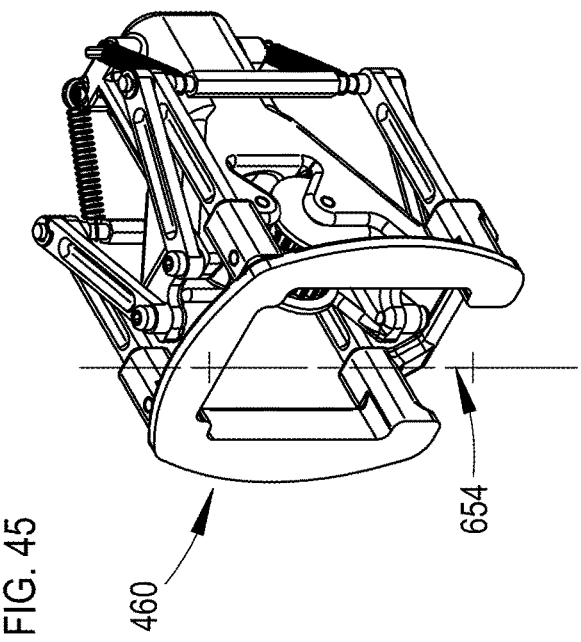
Figure 47:
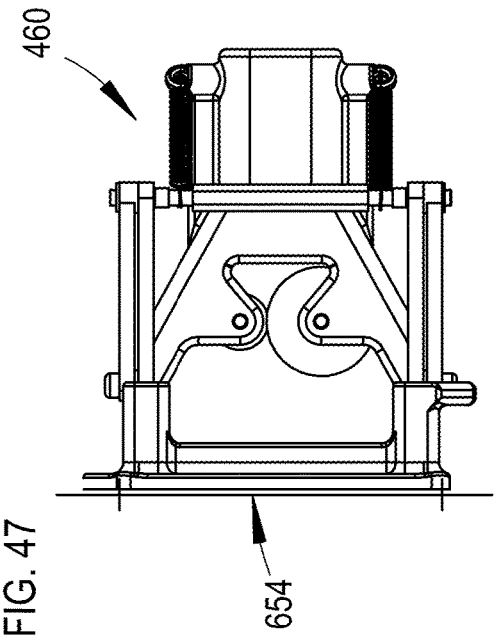

FIG. 45 is a perspective view, FIG. 46 is a top view, and FIG. 47 is a right side elevation view of the gimbaled cart dock 460. The compliance linkage assembly 616 is adapted to secure the platform 602 to the dock bracket 628 to provide compliance when the deck 604 engages the top of a scanner cart 88, such that the deck 604 preferably rotates about an axis 654 for an angle 658 of approximately six degrees in either angular direction, providing a total of twelve degrees of compliance. The axis 654 is preferably spaced apart from the surface of the deck 604, forward of the deck 604, spaced apart by a distance 656 of approximately 0.029 inches. The angle 658 and the spacing distance 656 together provide compliance for several degrees of misalignment between the scanner cart dock 460 and the surface of the scanner cart 88 during retrieval and between the scanner cart 88 and the surface of an EUT during deployment.

The present disclosure provides advantages of an NDE scanner which is deployed and retrieved by means of an aerial drone. The NDE scanner is deployed onto an EUT and has magnetic wheels allowing the NDE scanner to move over the EUT, on vertical and other non-horizontal surfaces. The NDE is retrievable by the aerial drone and includes a stand-off mechanism, selectively operable for separating the magnetic wheels from contacting the surface of the EUT to selectively release the NDE scanner from the EUT for retrieval by the aerial drone. The present disclosure further provides a dual gimbal arrangement provided by four sets of offset pins configured to provide constrained rotation about both an X-axis and a Y-axis, and preventing tipping of a probe sensor, while allowing movement of the probe sensor over surface non-conformities. A winch is provided having a cogged belt used for a deployment tether, providing control of extension and retraction of the deployment tether with slippage. A cart dock is provided with a gimbal linkage to provide compliance for misalignment between a scanner cart dock and a scanner cart during retrieval and between the scanner cart, the scanner cart dock and the surface of an EUT. The powered cart may also be utilized without an NDE scanner for deployment on a surface using the aerial drone and attachment with a winch made according to the present disclosure, and in such cases the surface would be that of an object other than an EUT.

Although the preferred embodiment has been described in detail, it should be understood that various changes, substitutions and alterations can be made therein without departing from the spirit and scope of the invention as defined by the appended claims.

What is claimed is:

1. An apparatus for aerial deployment of a powered cart on a surface of an object, comprising:
   an aerial drone;
   a powered cart configured for magnetically attaching and traversing over the surface of the object;
   a deployment tether extending between said aerial drone and said powered cart, interconnecting there-between for deployment and retrieval of said powered cart relative to said aerial drone and the surface of the object;
   wherein said aerial drone is located relative to the surface of the object for placing said powered cart proximate the surface, with said deployment tether extending between said aerial drone and said powered cart, then said powered cart is released to operate independently of said aerial drone, and after said deployment tether is spooled onto a winch to align said aerial drone and said powered cart for retrieval of said powered cart from the surface of the object;

said winch mounted to said aerial drone, said winch having a frame, a winch drive motor and a winch drive pulley, with said winch drive motor coupled to said winch drive pulley for engaging said deployment tether and moving in a first angular direction to dispense said deployment tether from said winch, and then moving in a second angular direction to retrieve said deployment tether onto said winch; and said winch including a deployment tether reel on which said deployment tether is reeled and spooled therefrom, and said winch further including a reel motor coupled to said deployment tether reel; and a control panel which provides control of said winch drive motor and said reel motor, wherein said reel motor is synchronized with said winch drive motor for spooling said deployment tether from said deployment tether reel when said deployment tether is dispensed from said winch and spooling said deployment tether onto said deployment tether reel when said deployment tether is retrieved onto said winch.

2. The apparatus according to claim 1, further comprising a take-up arm moveably mounted to said frame of said winch at a first section of said take-up arm, said take-up arm having a first end which is spaced apart from said first section of said take-up arm, wherein said first end of said take-up arm is disposed for engaging with said deployment tether between said deployment tether reel and said winch drive pulley with a take-up loop formed of said deployment tether extending about said first end of said take-up arm; and a position sensor extending between said frame of said winch and said take-up arm to detect a length of said take-up loop, from which said control panel synchronizes operation of said reel drive motor and said winch drive motor to provide compliance between said deployment tether being spooled from said deployment tether reel and dispensed from said winch, and spooling said deployment tether being reeled onto said deployment tether reel and said deployment tether being retrieved onto said winch and thereby define said length of said take-up loop.

3. The apparatus according to claim 1, further comprising a take-up arm having a first section which is pivotally mounted to said frame of said winch, a first end which is spaced apart from said first section, and a take-up idler disposed on said first end, wherein said take-up idler is disposed for engaging with said deployment tether between said deployment tether reel and said winch drive pulley with a take-up loop formed of said deployment tether extending about said take-up idler; and a position sensor extending between said frame of said winch and said take-up arm to detect a length of said take-up loop, from which said control panel synchronizes operation of said reel drive motor and said winch drive motor to provide compliance between said deployment tether being spooled from said deployment tether reel and dispensed from said winch, and spooling said deployment tether being reeled onto said deployment tether reel and said deployment tether being retrieved onto said winch and thereby define said length of said take-up loop.

4. The apparatus according to claim 1, further comprising a deployment arm mounted to said aerial drone, wherein said deployment tether is connected to said deployment arm for respectively aligning said powered cart and said aerial drone for placing said powered cart relative to the surface of the object for deployment and for retrieving said powered cart from the surface of the object; and a dock mounted to an outward end of said deployment arm, said dock having a dock bracket and a platform which is moveably connected to said dock bracket, wherein said platform defines a deck which engages a second one of said aerial drone and said powered cart during retrieval and deployment of said powered cart.

5. The apparatus according to claim 4, wherein said platform is mounted to said dock bracket by a compliance linkage, said compliance linkage having links with ends which are rotatably secured to said dock bracket and links which are non-rotatably secured to said platform in a constrained arrangement.

6. The apparatus according to claim 1, wherein an umbilical connector extends between said aerial drone and said powered cart for connecting there-between at least one of power, data signals, control signals and fluid, said umbilical connector being flexible for providing compliance therebetween.

7. The apparatus according to claim 6, further comprising an umbilical tether extending between said winch and said umbilical connector and said winch includes an umbilical tether reel on which said umbilical tether is spooled for deployment and retrieval, wherein said umbilical tether is reeled inward and onto said umbilical tether reel when said powered cart is being retrieved and said umbilical tether is spooled outward and from said umbilical tether reel when said powered cart is deployed.

8. The apparatus according to claim 1, wherein said deployment tether is formed of a flexible drive belt having two terminal ends.

9. The apparatus according to claim 1, wherein said deployment tether is formed of cogged drive belt having two terminal ends and said winch drive pulley is a cogged pulley having teeth for engaging with a toothed surface of said cogged drive belt.

10. An apparatus for aerial deployment of a powered cart on a surface of an Equipment Under Test (EUT), comprising:

an aerial drone;

a Non-Destructive Evaluation (NDE) scanner having powered cart to which an NDE probe is secured, said powered cart being configured for magnetically attaching and traversing over the surface of the EUT;

a deployment tether formed of flexible material and extending between said aerial drone and said powered cart, interconnecting there-between for deployment and retrieval of said powered cart relative to said aerial drone;

wherein said aerial drone is located relative to the EUT for placing said powered cart proximate the surface of the EUT, with said deployment tether extending between said aerial drone and said powered cart, then said powered cart is released to operate independently of said aerial drone, and after said deployment tether is spooled onto a winch to align said aerial drone and said powered cart for retrieval of said powered cart from the EUT;

said winch mounted to said aerial drone, said winch having a frame, a winch drive motor and a winch drive pulley, with said winch drive motor coupled to said winch drive pulley for engaging said deployment tether and moving in a first angular direction to dispense said deployment tether from said winch, and then moving in a second angular direction to retrieve said deployment tether onto said winch;

said winch including a deployment tether reel on which said deployment tether is reeled and spooled therefrom, and said winch further including a reel motor coupled to said deployment tether reel; and a control panel which provides control of said winch drive motor and said reel motor, wherein said reel motor is synchronized with said winch drive motor for spooling said deployment tether from said deployment tether reel when said deployment tether is dispensed from said winch and spooling said deployment tether onto said deployment tether reel when said deployment tether is retrieved onto said winch.

11. The apparatus according to claim 10, further comprising a take-up arm having a first section which is moveably mounted to said frame of said winch and a first end which is spaced apart from said first section, wherein said first end of said take-up arm is disposed for engaging with said deployment tether between said deployment tether reel and said winch drive pulley with a take-up loop formed of said deployment tether extending about said first end of said take-up arm; and a position sensor extending between said frame of said winch and said take-up arm to detect a length of said take-up loop, from which said control panel synchronizes operation of said reel drive motor and said winch drive motor to provide compliance between said deployment tether being spooled from said deployment tether reel and dispensed from said winch, and spooling said deployment tether being reeled onto said deployment tether reel and said deployment tether being retrieved onto said winch and thereby define said length of said take-up loop.

12. The apparatus according to claim 10, further comprising a take-up arm having a first section which is pivotally mounted to said winch and a second end which is spaced apart from said first end with a take-up idler disposed on said second end, wherein said take-up idler is disposed for engaging with said deployment tether between said deployment tether reel and said winch drive pulley with a take-up loop formed of said deployment tether extending about said take-up idler; and a position sensor extending between said winch and said take-up arm to detect a length of said take-up loop, from which said control panel synchronizes operation of said reel drive motor and said winch drive motor to provide compliance between said deployment tether being spooled from said deployment tether reel and dispensed from said winch, and spooling said deployment tether being reeled onto said deployment tether reel and said deployment tether being retrieved onto said winch and thereby define said length of said take-up loop.

13. The apparatus according to claim 12, further comprising said take-up arm having a second end disposed opposite said first end with said first section disposed there-between, and wherein a bias spring extends between said second end and said frame of said winch to press said take-up idler into said take-up loop formed of said deployment tether.

14. The apparatus according to claim 10, further comprising a deployment arm mounted to said aerial drone, wherein said deployment tether is connected to said deployment arm for respectively aligning said powered cart and said aerial drone for placing said powered cart relative to the EUT for deployment and for retrieving said powered cart from the EUT;

a dock mounted to an outward end of said deployment arm, said dock having a dock bracket and a platform which is moveably connected to said dock bracket, wherein said platform defines a deck which engages a second one of said aerial drone and said powered cart during retrieval and deployment of said powered cart; and wherein said platform is mounted to said dock bracket by a compliance linkage, said compliance linkage having links with ends which are rotatably secured to said dock bracket and links which are non-rotatably secured to said platform in a constrained arrangement.

15. The apparatus according to claim 10, further comprising an umbilical connector which extends between said aerial drone and said powered cart for connecting there-between at least one of power, data signals, control signals and fluid, said umbilical connector being flexible for providing compliance there-between; and an umbilical tether extending between said winch and said umbilical connector and said winch including an umbilical tether reel on which said umbilical tether is spooled for deployment and retrieval, wherein said umbilical tether is reeled inward and onto said umbilical tether reel when said powered cart is being retrieved and said umbilical tether is spooled outward and from said umbilical tether reel when said powered cart is deployed.

16. The apparatus according to claim 10, wherein said deployment tether is formed of a drive belt having two terminal ends and said winch drive pulley has a grooved rim which engages said drive belt.

17. The apparatus according to claim 10, wherein said deployment tether is formed of cogged drive belt having two terminal ends and said winch drive pulley is a cogged pulley having teeth for engaging with a toothed surface of said cogged drive belt.

18. An apparatus for aerial deployment of a powered cart on a surface of an Equipment Under Test (EUT), comprising:

an aerial drone;

a Non-Destructive Evaluation (NDE) scanner having powered cart to which an NDE probe is secured, said powered cart being configured for magnetically attaching and traversing over the surface of the EUT;

a deployment tether formed of flexible drive belt having two terminal ends and extending between said aerial drone and said powered cart, interconnecting there-between for deployment and retrieval of said powered cart relative to said aerial drone;

wherein said aerial drone is located relative to the EUT for placing said powered cart proximate the surface of the EUT, with said deployment tether extending between said aerial drone and said powered cart, then said powered cart is released to operate independently of said aerial drone, and after said deployment tether is spooled onto a winch to align said aerial drone and said powered cart for retrieval of said powered cart from the EUT;

said winch mounted to said aerial drone, said winch having a frame, a winch drive motor and a winch drive pulley, with said winch drive motor coupled to said winch drive pulley for engaging said deployment tether and moving in a first angular direction to dispense said deployment tether from said winch, and then moving in a second angular direction to retrieve said deployment tether onto said winch; and said winch including a deployment tether reel on which said deployment tether is reeled and spooled therefrom, and said winch further including a reel motor coupled to said deployment tether reel;

a control panel which provides control of said winch drive motor and said reel motor, wherein said reel motor is synchronized with said winch drive motor for spooling said deployment tether from said deployment tether reel when said deployment tether is dispensed from said winch and spooling said deployment tether onto said deployment tether reel when said deployment tether is retrieved onto said winch;

a take-up arm having a first section which is pivotally mounted to said winch and a second end which is spaced apart from said first end with a take-up idler disposed on said second end, wherein said take-up idler is disposed for engaging with said deployment tether between said deployment tether reel and said winch drive pulley with a take-up loop formed of said deployment tether extending about said take-up idler;

a position sensor extending between said winch and said take-up arm to detect a length of said take-up loop, from which said control panel synchronizes operation of said reel drive motor and said winch drive motor to provide compliance between said deployment tether being spooled from said deployment tether reel and dispensed from said winch, and spooling said deployment tether being reeled onto said deployment tether reel and said deployment tether being retrieved onto said winch and thereby define said length of said take-up loop;

a deployment arm mounted to said aerial drone, wherein said deployment tether is connected to said deployment arm for respectively aligning said powered cart and said aerial drone for placing said powered cart relative to the EUT for deployment and for retrieving said powered cart from the EUT;

a dock mounted to an outward end of said deployment arm, said dock having a dock bracket and a platform which is moveably connected to said dock bracket, wherein said platform defines a deck which engages a second one of said aerial drone and said powered cart during retrieval and deployment of said powered cart; and wherein said platform is mounted to said dock bracket by a compliance linkage, said compliance linkage having links with ends which are rotatably secured to said dock bracket and links which are non-rotatably secured to said platform in a constrained arrangement.

19. The apparatus according to claim 18, further comprising an umbilical connector which extends between said aerial drone and said powered cart for connecting therebetween at least one of power, data signals, control signals and fluid, said umbilical connector being flexible for providing compliance there-between; and an umbilical tether extending between said winch and said umbilical connector and said winch including an umbilical tether reel on which said umbilical tether is spooled for deployment and retrieval, wherein said umbilical tether is reeled inward and onto said umbilical tether reel when said powered cart is being retrieved and said umbilical tether is spooled outward and from said umbilical tether reel when said powered cart is deployed.

20. The apparatus according to claim 18, further comprising said take-up arm having a second end disposed opposite said first end with said first section disposed there-between, and wherein a bias spring extends between said second end and said frame of said winch to press said take-up idler into said take-up loop formed of said deployment tether; and wherein said flexible drive belt from which said deployment tether is a cogged drive belt having two terminal ends and said winch drive pulley is a cogged pulley having teeth for engaging with a toothed surface of said cogged drive belt.

\* \* \* \* \*